(12) United States Patent
Tagawa

(10) Patent No.: US 6,367,122 B1
(45) Date of Patent: Apr. 9, 2002

(54) HINGE STRUCTURE

(75) Inventor: Kazusato Tagawa, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/472,334

(22) Filed: Dec. 27, 1999

(30) Foreign Application Priority Data

Dec. 28, 1998 (JP) .......................... 10-372325

(51) Int. Cl.$^7$ .................. E05D 11/08; E05D 7/12
(52) U.S. Cl. .................. 16/342; 16/257; 16/262; 16/271; 16/336; 16/341; 361/381; 361/382; 361/383
(58) Field of Search .............. 16/257, 260, 262, 16/263, 265, 266, 271, 272, 342, 267, 336, 341; 220/4.22, 4.23, 840; 379/433, 434; 361/681, 682, 683

(56) References Cited

U.S. PATENT DOCUMENTS

| | | | |
|---|---|---|---|
| 1,166,551 A | * 1/1916 | Simmons | 16/342 |
| 2,598,093 A | * 5/1952 | Arens | 16/257 |
| 2,734,222 A | * 2/1956 | Kiba | 16/257 |
| 3,284,844 A | * 11/1966 | Seckerson | 16/267 |
| 3,952,369 A | 4/1976 | Erickson | |
| 4,470,517 A | * 9/1984 | Carrier | 16/257 |
| 4,967,924 A | * 11/1990 | Murofushi et al. | 220/4.22 |
| 5,303,291 A | 4/1994 | Takagi | |
| 5,316,168 A | 5/1994 | Finch | |
| 5,711,571 A | 1/1998 | Renahy | |
| 6,000,550 A | * 12/1999 | Simpson et al. | 220/840 |
| 6,099,097 A | * 1/2000 | Hocker et al. | 16/225 |
| 6,046,975 A | 4/2000 | Seo | |
| 6,152,317 A | * 11/2000 | Newby, Sr. | 16/259 |

* cited by examiner

Primary Examiner—Chuck Y. Mah
(74) Attorney, Agent, or Firm—Rosenman & Colin LLP

(57) ABSTRACT

A simple and compact hinge structure pivotally and detachably fixes a lid to a housing. The hinge structure has a shaft provided for the housing and a bearing unit provided for the lid. The bearing unit has a shaft-attaching/detaching opening for attaching or detaching the shaft in the axial direction. The bearing unit further includes a first bearing for receiving one portion of the peripheral surface of the shaft and a second bearing for receiving another portion of the peripheral surface of the shaft. The first bearing and the second bearing face each other. The space between the first bearing and the second bearing becomes narrower as it is closer to the shaft-attaching/detaching opening. The second bearing is formed of a leaf spring. With this arrangement, even if an excessive force is applied to the lid or the housing, it is possible to prevent both the elements from being destroyed.

8 Claims, 43 Drawing Sheets

HINGE STRUCTURE

BACKGROUND OF THE INVENTION

1. Field of the Invention

The present invention generally relates to hinge structures and, more particularly, to a hinge structure for use in an operation panel, for example, that is pivotally fixed to a portable electronic device, such as a memory card device or the like, which serves as an auxiliary storage device, for an information apparatus.

2. Description of the Related Art

A conventional portable electronic device, such as a memory card device for example, or a sub-unit is used by being inserted into a main unit of an information apparatus, such as an entertainment system, of which a typical example is a video game machine. Such a portable electronic device or a sub-unit of the information apparatus has an interface for connecting the device or the sub-unit to the main unit of the information apparatus and a non-volatile storage device for storing data.

FIG. 1A illustrates the configuration of the main portion of a memory card device, which serves as an example of conventional portable electronic devices. A memory card generally indicated by 10 includes a control unit 11 for controlling the operation of the memory card 10, a connector 12 used for connecting the memory card 10 to a terminal provided for a slot of the main unit, such as an information apparatus, and a non-volatile memory 16 for storing data. The connector 12 and the non-volatile memory 16 are connected to the control unit 11.

The control unit 11 may be formed of a microcomputer. As the non-volatile memory 16, a flash memory, such as an electrically erasable programmable read-only memory (EEPROM) may be used. As an interface for connecting the memory card 10 to the information apparatus, a microcomputer, which serves as a controller for interpreting protocols, may be used.

FIG. 1B illustrates items to be controlled by the control unit 11 of the memory card 10. FIG. 1B shows that the control unit 11 of the conventional memory card 10 includes only a main-unit-connecting interface for connecting the memory card 10 to the main unit, such as the information apparatus, and a memory interface for inputting and outputting data into and from the non-volatile memory 16.

Conventional video game machines, such as home-use TV game machines, have a function of storing game data into auxiliary storage devices. The above-described memory card device is also used as such an auxiliary storage device of the video game machine.

Referring to the schematic diagram illustrating an example of conventional video game machines using a memory card as an auxiliary storage device shown in FIG. 2, a main unit 2 of a conventional video game machine generally represented by 1 is accommodated within a generally quadrilateral housing. A disk-loading portion 3 is disposed at the center of the main unit 2 so as to load an optical disc, which is a recording medium for recording an application program, such as a video game. The main unit 2 also includes a reset switch 4 for resetting the game at any time, a power-supply switch 5, a disc operating switch 6 for operating the loading of the optical disc, and two slots 7A and 7B.

The memory card 10, which serves as an auxiliary storage device, is inserted into one of the slots 7A and 7B, and, for example, a game result obtained by executing the game on the video game machine 1 is sent from a control unit (central processing unit (CPU)) 19 and is written into the non-volatile memory 16. A plurality of operation units (controllers) (not shown) may be connected to the slots 7A and 7B, so that a plurality of users can simultaneously play an opposing game.

Hitherto, in the aforementioned conventional portable electronic devices, as shown in FIG. 3, an operation panel 203 may be pivotally fixed to a main unit 201 of the device via a hinge unit 202.

The hinge unit 202 is configured, as illustrated in FIG. 4, in such a manner that a shaft 205 projects from a casing 204, the shaft 205 being formed in a non-circular shape, as shown in FIG. 5. The hinge unit 202 is rotatable by a support component (not shown) built into the casing 204, and is stopped rotating every 180 degrees by an urging force of a spring (not shown) which is also built into the casing 204.

The above-configured hinge unit 202 is fixed at a predetermined position of the main unit 201 of the portable electronic device, as illustrated in FIG. 6, and the operation panel 203 is fitted to the shaft 205.

However, a large space is required for the above type of hinge unit 202 since the support component and the spring are built into the casing 204, thereby hampering the miniaturization of the hinge unit 202 and the saving of space. It is also difficult to detach the operation panel 203 from the main unit 201 of the electronic device. Additionally, if an excessive force is applied to the operation panel 203, not only the operation panel 203, but also the main unit 201 of the electronic device may be destroyed.

SUMMARY OF THE INVENTION

Accordingly, in order to solve the above-described problems, it is an object of the present invention to provide a simple and compact hinge structure which allows a movable portion to be easily attached to and detached from a main unit of a device and which prevents the movable portion and the main unit of the device from being destroyed even if an excessive force is applied to such movable unit.

In order to achieve the above object, according to the present invention, there is provided a hinge structure for pivotally and detachably fixing a movable unit to a main unit. The hinge structure of the invention preferably includes a shaft provided for one of the movable unit and the main unit, and a bearing unit provided for the one of the movable unit and the main unit that is not provided with the shaft. The bearing unit includes an opening for attaching or detaching the shaft in an axial direction. The bearing unit includes a first bearing for receiving one portion of a peripheral surface of the shaft and a second bearing for receiving another portion of the peripheral surface of the shaft, the first bearing and the second bearing facing or positioned adjacent each other. A space formed between the first bearing and the second bearing becomes narrower as it is closer to the opening, and at least one of the first bearing and the second bearing is formed of an elastic member.

The surface of the first bearing for receiving the shaft may preferably be formed in an arch-like shape, and the first bearing may preferably be formed of a non-elastic member provided for or formed from the main unit.

The surface of the second bearing for receiving the shaft may preferably be planar in shape, and the second bearing may preferably be formed of an elastic member, such as, for example, a leaf spring, provided for the main unit.

The shaft may preferably include a surface and a cam-like projection provided at part of the surface. The projection may preferably be located on the surface of the shaft at a position at which the bearing unit elastically slides over the cam-like projection while the movable unit is pivoting, in particular, while the movable unit is pivoting between a rising (open) state and a lying (closed) state.

The movable unit may preferably include an engaging portion to be engaged with part of the main unit when the movable unit is in a lying state. The engaging portion may preferably be configured to displace the movable unit in a direction in which a space between the first bearing and the second bearing widens against an elastic force while the engaging portion is engaged or is being engaged. The engaging portion may preferably include an engaging projection which slides over part of the main unit.

The opening may preferably widen due to an elastic deformation of the elastic member when attaching or detaching the shaft.

With the above arrangement, when an excessive force is applied to the movable unit or the main unit, the space between the first bearing and the second bearing widens by the shaft against an elastic force of the elastic member, thereby releasing the shaft from the bearing.

DESCRIPTION OF THE PREFERRED EMBODIMENTS

A preferred embodiment of the present invention is described below with reference to the drawings. A portable electronic device, which is accommodated within an electronic-device protective housing, according to an embodiment of the present invention is used as a memory card device in a main unit of an entertainment system, such as a video game machine. The portable electronic device may also be used as an independent unit, such as a portable compact game machine. The main unit is not restricted to a video game machine. When the portable electronic device is used as a sub-unit, it does not necessarily possess a memory card function.

A description is first given below of a video game machine, which serves as a main unit, using the portable electronic device as a sub-unit.

Figure 1A:
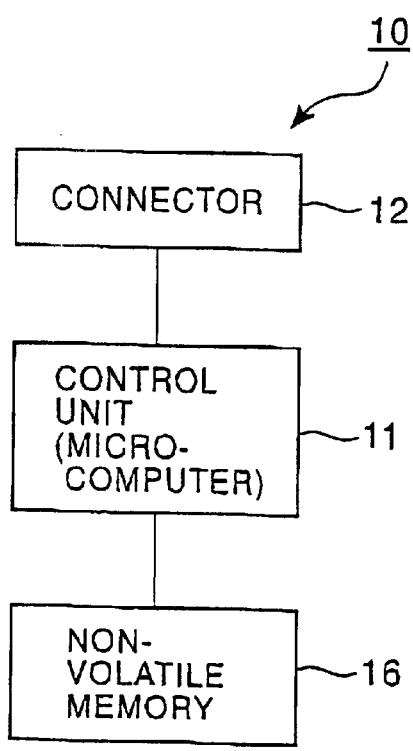
FIGS. 1A and 1B illustrate the configuration of the main portion of a conventional memory card device.
Figure 1B:
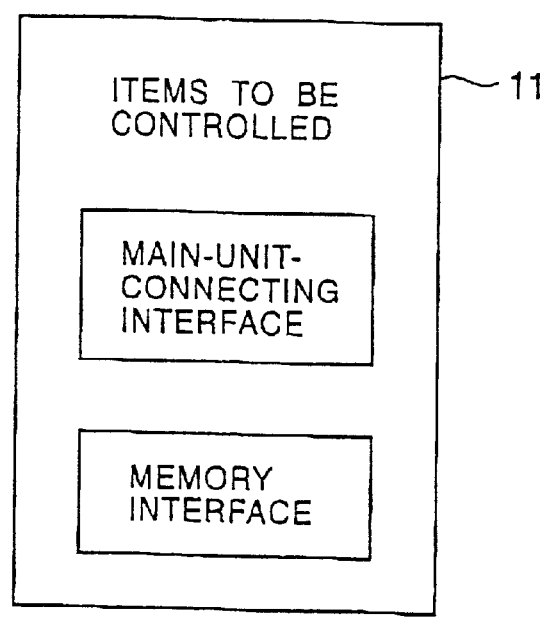
Figure 2:
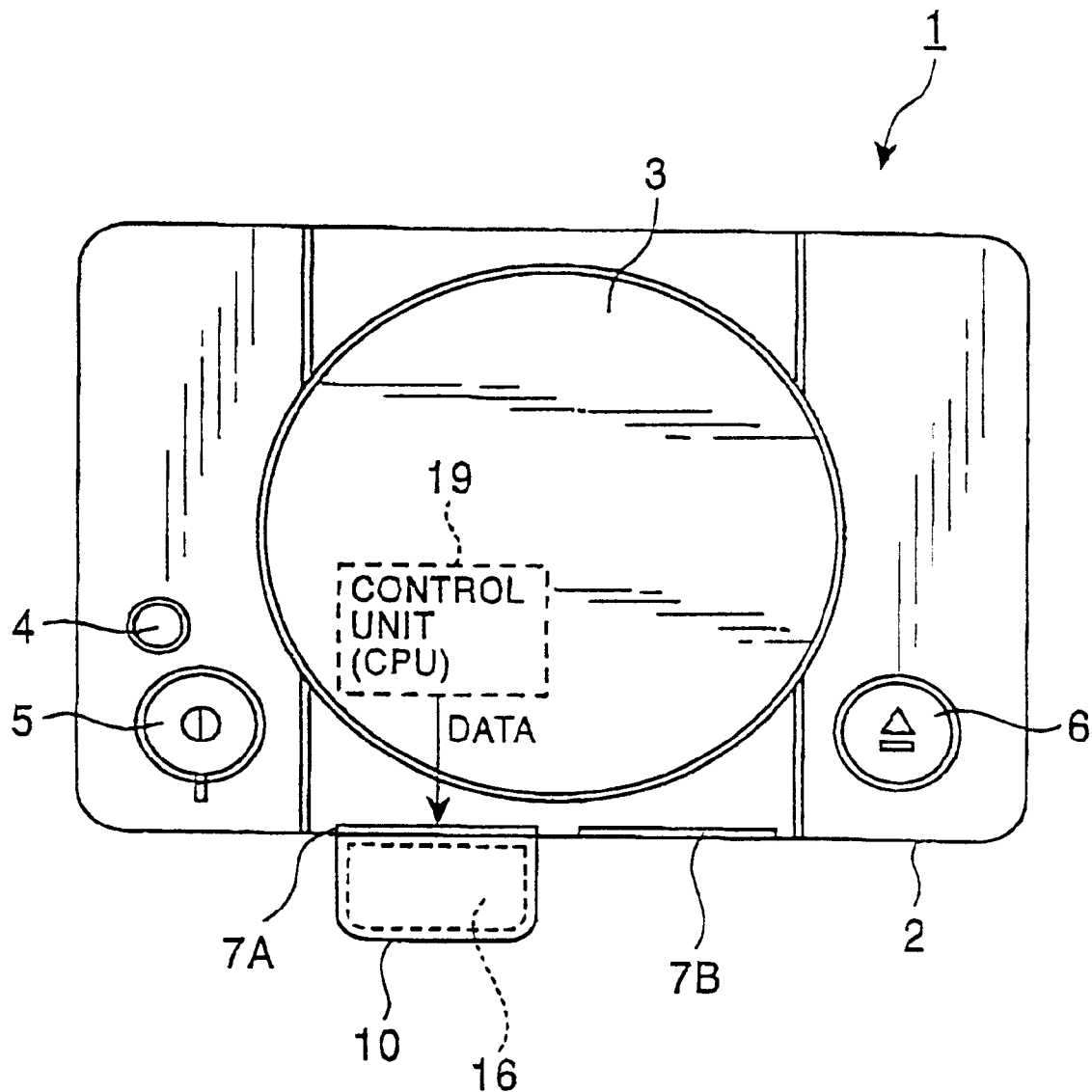
FIG. 2 illustrates an example of a conventional video game machine using a memory card as an auxiliary storage device.
Figure 3:
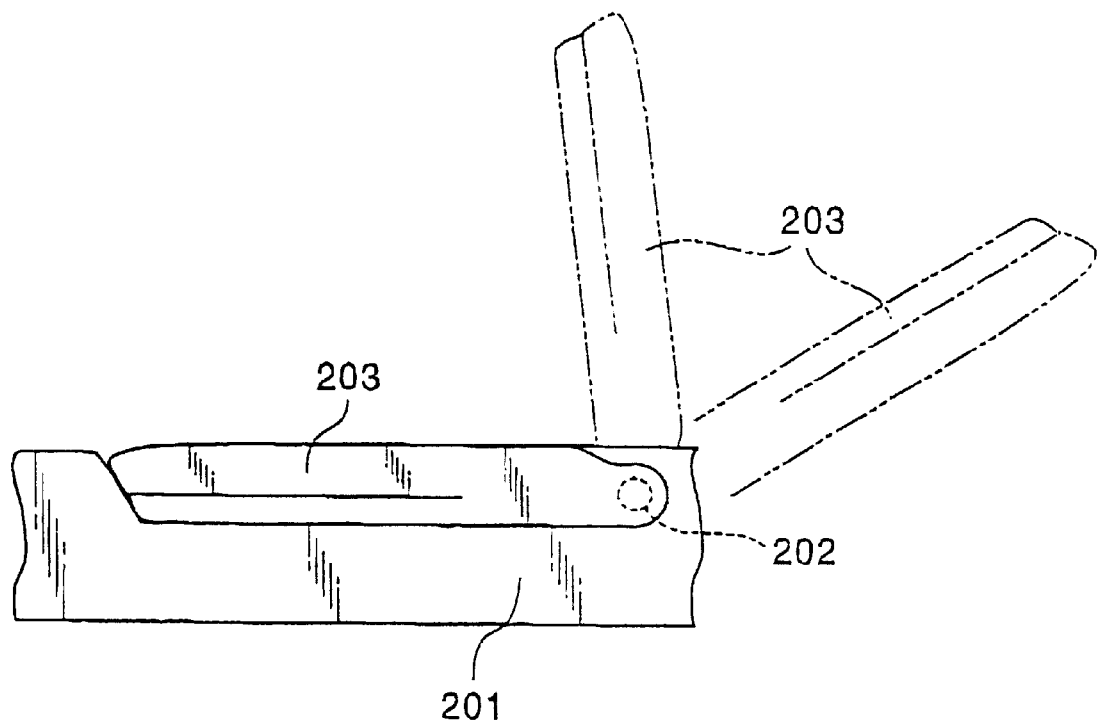
FIG. 3 schematically illustrates a portable electronic device incorporating a conventional hinge structure.
Figure 4:
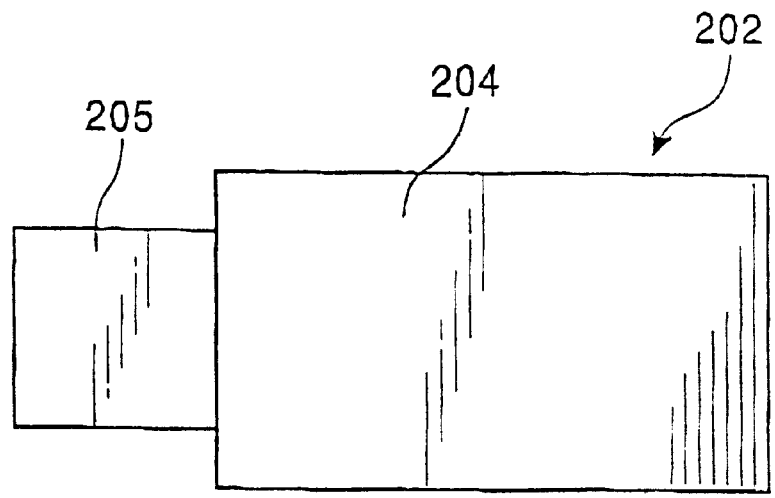
FIG. 4 is a side view illustrating a conventional hinge unit.
Figure 5:
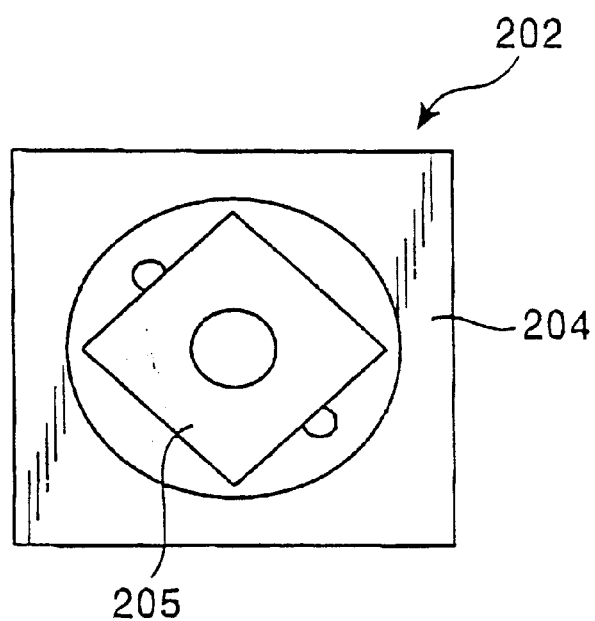
FIG. 5 is a front view illustrating a conventional hinge unit.
Figure 6:
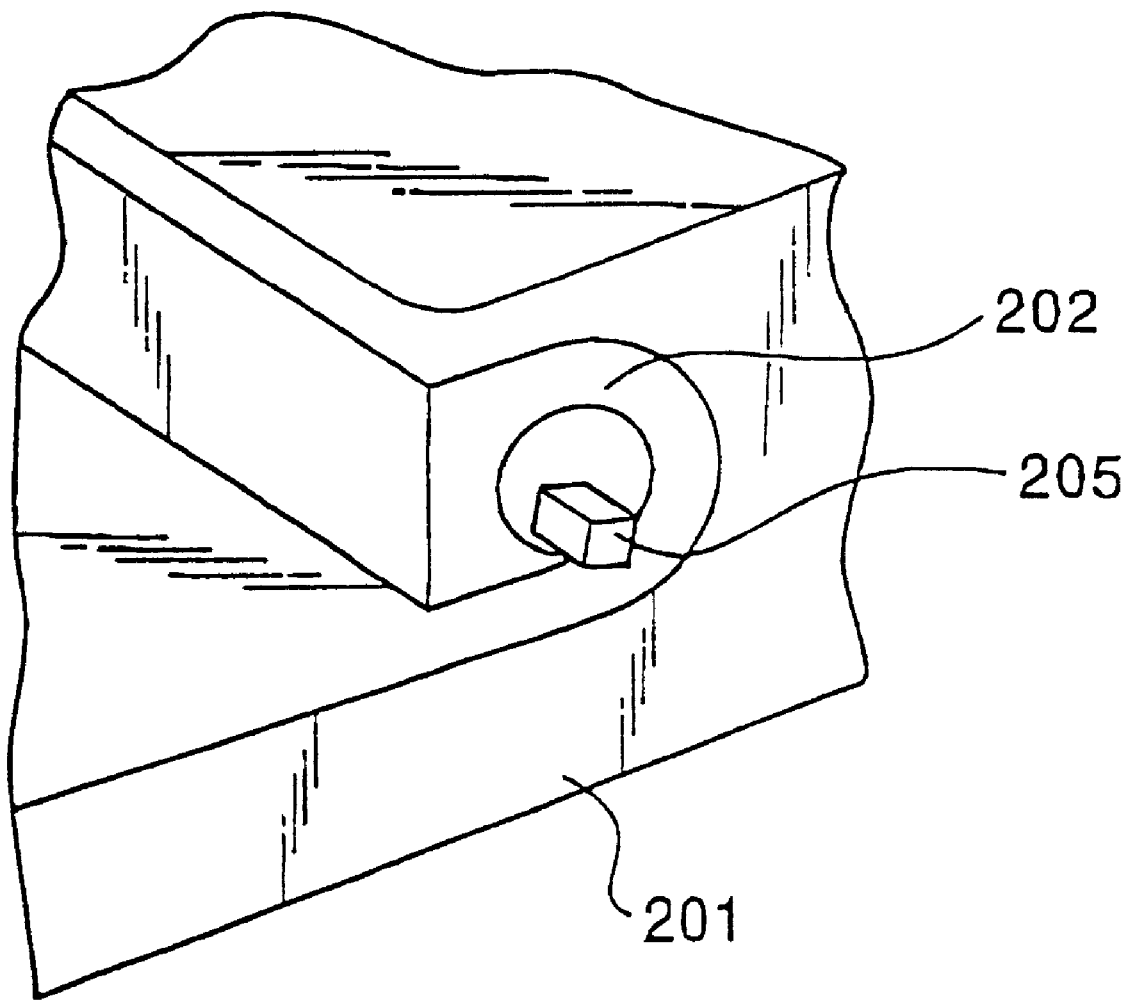
FIG. 6 is a perspective view illustrating a conventional hinge unit attached to a portable electronic device.
Figure 7:
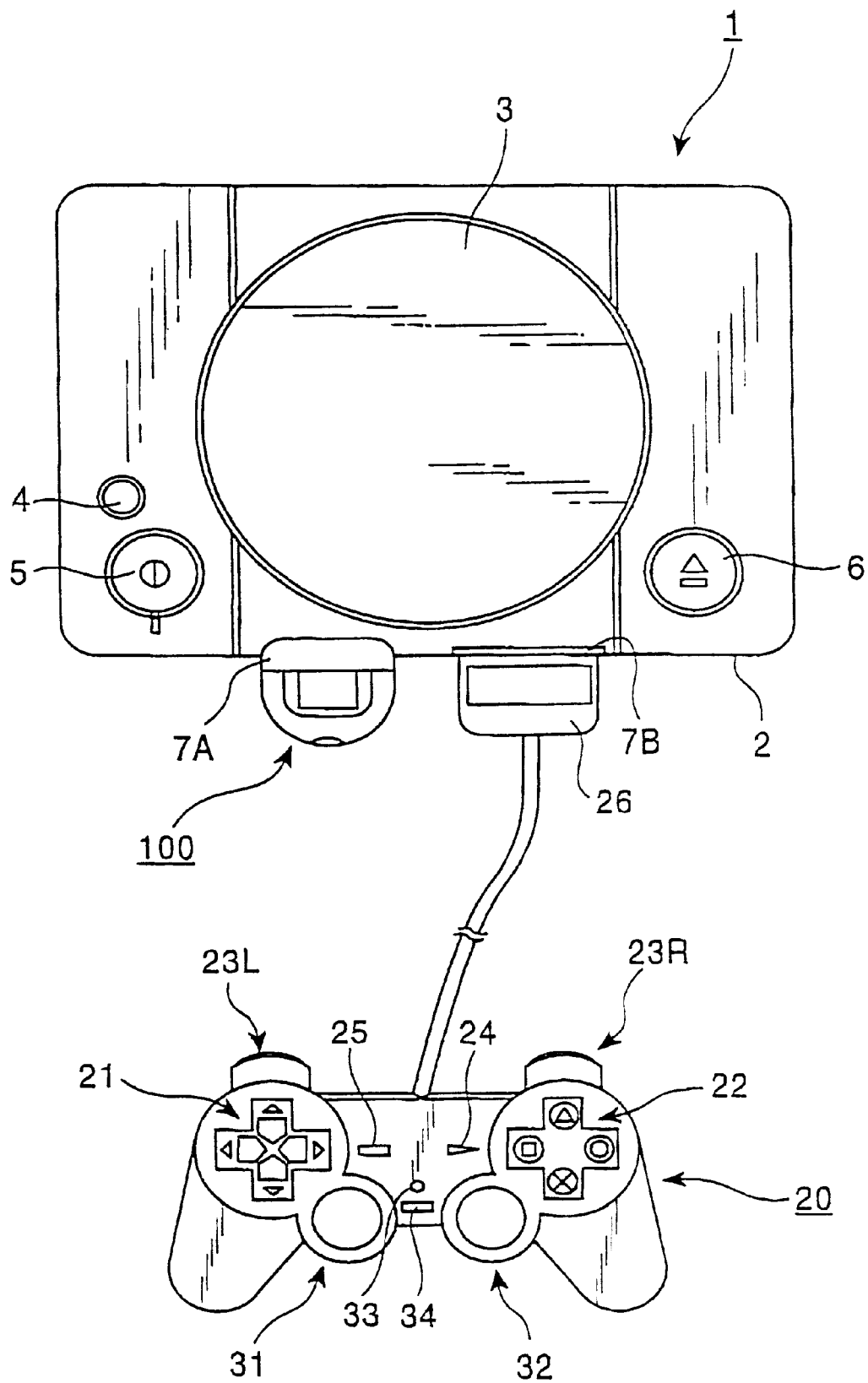
FIG. 7 is an outer plan view illustrating a video game machine, which serves as a main unit, using a portable electronic device as a sub-unit.

FIG. 7 is an outer view illustrating a video game machine to which the portable electronic device is attached. A video game machine generally represented by 1 reads a game program recorded on, for example, an optical disc, and executes it according to instructions from a user (game player). In the present invention, the execution of the game is to mainly control the progress of the game, and the display and sound.

A main unit 2 of the video game machine is stored within a generally quadrilateral housing. A disk-loading portion 3 is disposed at the center of the main unit 2 so as to load an optical disc, such as a compact disk-read only memory (CD-ROM), which is a recording medium for supplying an application program, such as a video game. The main unit 2 also includes a reset switch 4 for resetting the game at any time, a power-supply switch 5, a disc operating switch 6 for operating the loading of the optical disc, and two slots 7A and 7B.

The recording medium for supplying an application program is not limited to an optical disc. Alternatively, an application program may be supplied via a communication network.

Two operation units (controllers) 20 may be connected to the corresponding slots 7A and 7B, so that two users can play an opposing game. The above-described memory card device or the portable electronic device may be connected to the slot 7A or 7B.

In FIG. 7, the two slots 7A and 7B are provided for the video game machine 1 by way of example only, and the number of slots is not restricted to two.

The operation unit 20 has first and second operating portions 21 and 22, an L button 23L, an R button 23R, a start button 24, and a selection button 25. The operation unit 20 is also provided with analog operating portions 31 and 32 which can be manually operated, a mode-selecting switch 33 for selecting the operation mode of the analog operating portions 31 and 32, and an indicator 34 for indicating the selected operation mode. A vibration mechanism (not shown) is further provided within the operation unit 20.

Figure 8:
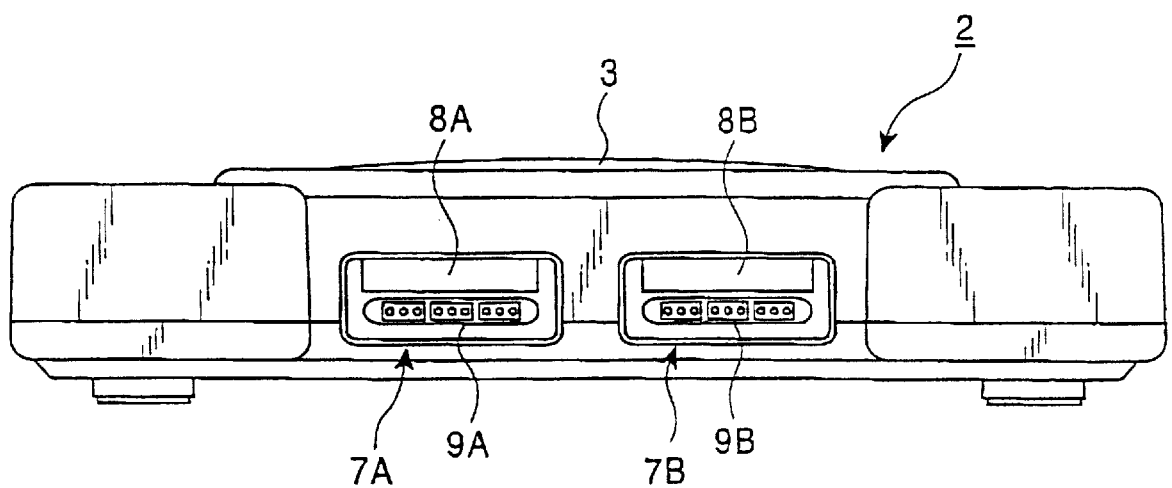
FIG. 8 is a rear view illustrating slots of the video game machine shown in FIG. 7.

FIG. 8 illustrates the slots 7A and 7B provided at the front side of the main unit 2 of the video game machine 1.

In this embodiment, each of the slots 7A and 7B is formed in two rows. Memory-card inserting portions 8A and 8B for receiving the above-described memory card 10 or a portable electronic device 100, which will be discussed later, are provided at the upper rows of the slots 7A and 7B, respectively. Controller-connecting portions (jacks) 9A and 9B for receiving a connecting terminal (connector) 26 of the controller 20 are provided at the lower rows of the slots 7A and 7B, respectively.

Slots of the memory-card inserting portions 8A and 8B are horizontally elongated in a rectangular shape, and the two corners at the lower edge of the elongated slot are formed rounder than the two corners at the upper edge thereof, thereby preventing the memory card 10 from being inserted in a wrong direction. The memory-card inserting portions 8A and 8B have a shutter for protecting a connecting terminal which is provided within each of the inserting portions 8A and 8B and which is used for establishing an electrical connection.

Slots of the controller-connecting portions 9A and 9B are elongated backward (into the plane of FIG. 8) in a rectangular shape, and the two corners at the lower edge of the elongated slot are formed rounder than the two corners at the upper edge thereof, thereby preventing the connecting terminal 26 of the controller 20 from being connected in a wrong direction. For preventing the memory card 10 from being erroneously inserted into the slot of the controller-connecting portion 9A or 9B, the slots of the controller-connecting portions 9A and 9B are configured in a different shape from those of the memory-card inserting portions 8A and 8B.

Figure 9:
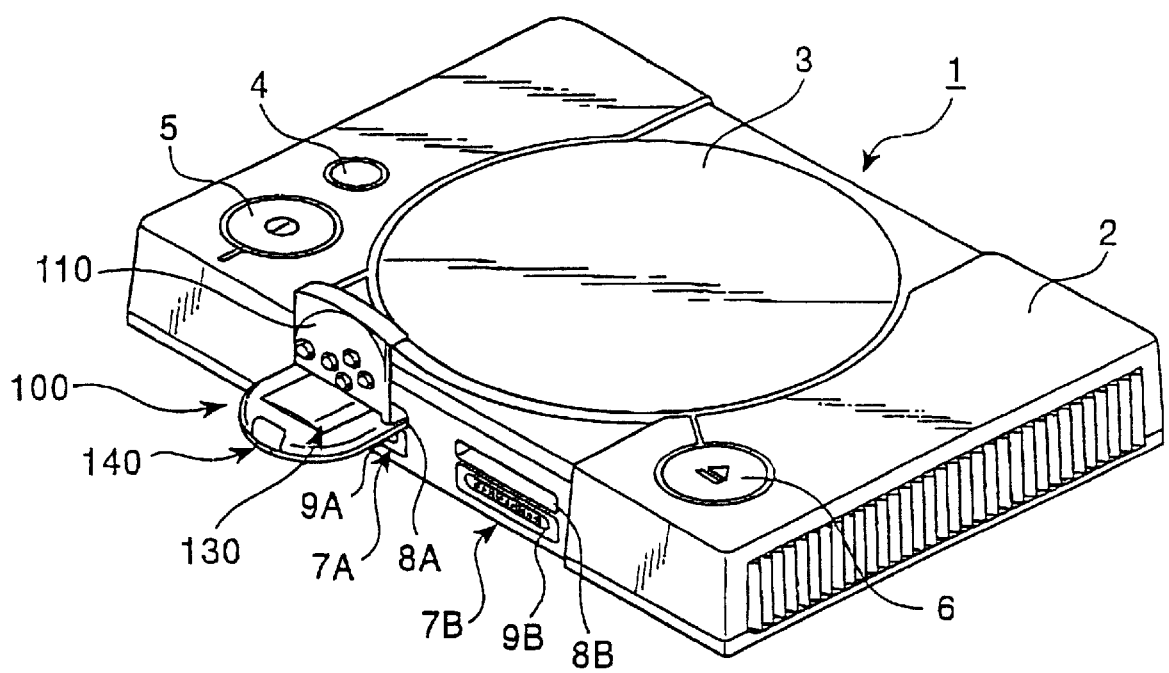
FIG. 9 is an outer perspective view illustrating the video game machine shown in FIG. 7.

FIG. 9 illustrates the video game machine 1 in the state in which the portable electronic device 100 is inserted into the memory-card inserting portion 8A of the slot 7A.

Figure 10:
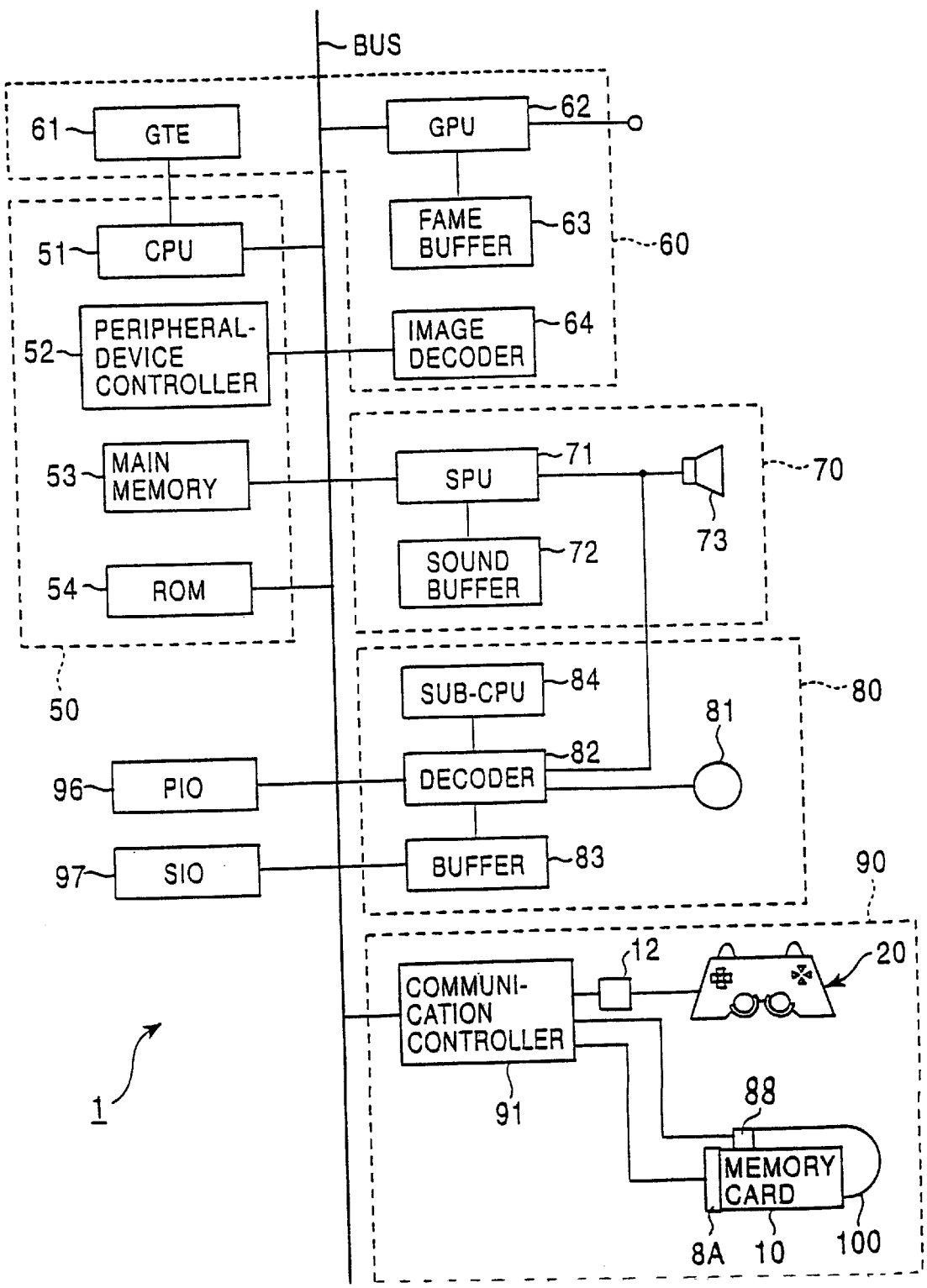
FIG. 10 is a block diagram illustrating the specific configuration of the main portion of the video game machine shown in FIG. 7.

FIG. 10 is a block diagram schematically illustrating the circuit configuration of the main portion of the video game machine 1.

The video game machine 1 is formed of a control system 50 including a CPU 51 and peripheral devices, a graphic system 60 including a graphic processing unit (GPU) 62 for drawing graphics on a frame buffer 63, a sound system 70 including a sound processing unit (SPU) 71 for issuing music and surround sound effects, an optical-disc controlling unit 80 for controlling an optical disc on which an application program is recorded, a communication controlling unit 90 for controlling the input and the output of data into and from the above-described memory card 10 or the portable electronic device 100, and a bus (BUS) to which the above-described components are connected.

The individual systems of the video game machine 1 are described in greater detail below. The control system 50 has the CPU 51, a peripheral-device controller 52 for controlling interrupt operations and direct memory access (DMA) transfer operations, a main memory (main storage device) 53, such as a random access memory (RAM), and a ROM 54 for storing programs, such as an operating system (OS) for managing the main memory 53, the graphic system 60, the sound system 70, and so on. The term "main memory" used in this specification means a memory from which programs are executable.

The above-described CPU 51 controls the entire video game machine 1 by running the OS stored in the ROM 54. The CPU 51 is formed of, for example, a 32-bit reduced instruction set computer (RISC)-CPU.

In the video game machine 1, when power is turned on, the CPU 51 of the control system 50 runs the OS stored in the ROM 54, thereby controlling the graphic system 60 and the sound system 70. After running the OS, the CPU 51 initializes the entire video game machine 1, such as checking the operation, and then, controls the optical-disc control unit 80, thereby running an application program, such as a game, recorded on the optical disc. By executing the application program, such as a game, the CPU 51 controls the graphic system 60 and the sound system 70 according to instructions input from the user, thereby controlling images to be displayed and music and surround sound effects to be issued.

The graphic system 60 is formed of a geometry transfer engine (GTE) 61 to execute processing, such as coordinate transforms, the GPU 62 for drawing graphics according to a drawing command from the CPU 51, the frame buffer 63 for storing images drawn by the GPU 62, and an image decoder 64 for decoding image data which has been compressed and coded by using orthogonal transforms, such as discrete cosine transform.

The GTE 61 is provided with a parallel-computation function for simultaneously conducting a plurality of computations, thereby concurrently performing fast computations, such as coordinate transforms, light-source calculations, and matrix or vector calculations. More specifically, when performing computations for flat shading in which a single triangle-shaped polygon is drawn in the same color, the GTE 61 adequately performs coordinate computations at a maximum of about 1.5 million polygons per second. Accordingly, in this video game machine 1, the load of the CPU 51 can be reduced, and fast coordinate computations can be achieved.

The GPU 62 draws polygons on the frame buffer 63 according to a drawing command from the CPU 51. The GPU 62 adequately draws at a maximum of about 360,000 polygons per second.

The frame buffer 63 is formed of what is called a dual-port RAM, so that it can simultaneously store images written by the GPU 62 or data transferred from the main memory by using one port, and outputs images from the buffer 63 for display by using the other port. The frame buffer 63 has, for example, a one Mega Byte capacity, and is divided into 16-bit 512×1024 matrices. The frame buffer 63 is provided with not only a display area on which a video output is displayed, but also a color look-up table (CLUT) area for storing a CLUT to which the GPU 62 refers when drawing polygons, and a texture area for storing textures inserted (mapped) onto polygons transformed into coordinates and drawn by the GPU 62. The CLUT area and the texture area are dynamically modified as the display area is changed.

In addition to the above-described flat shading, the GPU 62 is able to perform Gouraud shading for determining a color inside a polygon by conducting interpolations from the colors of the vertices of the polygon, and texture mapping for pasting a texture stored in the texture area onto a polygon. In conducting Gouraud shading or texture mapping, the GTE 61 is capable of performing coordinate computations at a maximum of about 500,000 polygons per second.

The image decoder 64 decodes still-image or moving-picture data stored in the main memory 53 and stores the decoded data in the main memory 53 under the control of the CPU 51.

The reproduced image data is also stored in the frame buffer 63 via the GPU 62, and thus, it can be used as a background of an image to be drawn by the GPU 62.

The sound system 70 is formed of the SPU 71 for issuing music, surround sound effects, etc. according to an instruction from the CPU 51, a sound buffer 72 for recording waveform data by using the SPU 71, and a speaker 73 for outputting music, surround sound effects, etc. generated by the SPU 71.

The SPU 71 further includes an adaptive differential pulse code modulation (ADPCM) decoding function of reproducing, for example, 16-bit ADPCM sound data represented by 4-bit difference signals, a reproducing function of generating surround sound effects by reproducing waveform data stored in the sound buffer 72, and a modulation function of reproducing waveform data stored in the sound buffer 72 by modulating the data.

According to the above-mentioned functions, the sound system 70 can be used as what is called a sampling sound source for generating music, surround sound effects, etc., according to an instruction from the CPU 51, based on the waveform data stored in the sound buffer 72.

The optical-disc control unit 80 includes an optical disc device 81 for reproducing a program or data recorded on an optical disc, a decoder 82 for decoding a program or data added with, for example, an error correction code (ECC), and a buffer 83 for speeding up the reading operation of data from the optical disc by temporarily storing the data in the buffer 83. A sub-CPU 84 is connected to the decoder 82.

Sound data recorded on the optical disc and read by the optical disc device 81 is not restricted to the above-described ADPCM data, and may be PCM data obtained by converting an analog sound signal into a digital sound signal.

The ADPCM sound data, for example, 16-bit digital data represented by 4-bit difference signals, is decoded by the decoder 82 and is then supplied to the SPU 71. In the SPU 71, the sound data is converted into analog sound data, which is then used for driving the speaker 73.

The PCM sound data, for example, 16-bit digital data, is decoded by the decoder 82, and is then used for driving the speaker 73.

The communication control unit 90 has a communication controller 91 for controlling communications with the CPU 51 via the bus. The communication controller 91 is further provided with the controller-connecting portions 9A and 9B for connecting the controller 20 through which instructions are input from a user, and the memory-card inserting portions 8A and 8B for receiving the portable electronic device 100 or the memory card 10, which serves as an auxiliary storage device for storing data indicating, for example, the current setting of a game.

The controller 20 connected to the controller-connecting portion 9A or 9B has, for example, 16 instruction keys, for inputting instructions from a user, and transmits the status of the keys to the communication controller 91 by means of synchronous communications, according to an instruction from the communication controller 91, approximately 60 times per second. The communication controller 91 then transmits the status of the keys of the controller 20 to the CPU 51.

Upon receiving an instruction from the user, the CPU 51 executes processing corresponding to the instruction based on the game program which is currently under execution.

In reading programs, and displaying or drawing images, it is necessary to transfer a large amount of image data at a high speed among the main memory 53, the GPU 62, the image decoder 64, and the decoder 82. Accordingly, in this video game machine 1, data can be directly transferred among the above-mentioned components under the control of the peripheral-unit controller 52 without the interference of the CPU 51, i.e., DMA transfer can be performed. By virtue of this DMA transfer, the load of the CPU 51 can be reduced, and fast data transfer can be achieved.

When a necessity arises to store data indicating the current setting of the game, the CPU 51 transmits the data to the communication controller 91. The communication controller 91 then writes the data into the memory card 10 or the portable electronic device 100 inserted into the slot of the memory-card inserting portion 8A or 8B.

The communication controller 91 has a built-in protective circuit for protecting from electrical breakdown. The above-mentioned memory card 10 and the portable electronic device 100 are separated from the bus, so that they can be attached to or detached from the machine 1 while the main unit 2 of the machine 1 is switched on. Accordingly, when the storage capacity of the memory card 10 or the electronic device 100 has run out, it can be replaced by a new memory card or a new electronic device without needing to shut down the main unit. This protects the game data to be backed up from being lost and makes it possible to write data into a new memory card.

A parallel interface (PIO) 96 is used for connecting the video game machine 1 to a peripheral device, while a serial interface (SIO) 97 is used for connecting the video game machine 1 to another video game machine.

The portable electronic device 100 is discussed in detail below, assuming that the electronic device 100 is used as a sub-unit to be inserted into the above-described video game machine 1, which serves as the main unit.

That is, the portable electronic device 100, which serves as a sub-unit, is fixed to the memory-card inserting portion 8A or 8B provided for the slot 7A or 7B of the video game machine 1, and is used as a memory card corresponding to the connected operation unit 20. For example, if two users (game players) play a game, the game results of the individual users are recorded on the two portable electronic devices 100.

Conductors of a power supply connecting terminal and a grounding connecting terminal of the memory card 10 or the electronic device 100 are formed longer than those of the other terminals so that the power supply terminal and the grounding terminal can be electrically connected earlier than the other terminals when inserting the memory card 10 or the portable electronic device 100 into the memory-card inserting portion 8A or 8B. The reason for this is to ensure the safety and stability of electrical operation. Alternatively, the connecting conductors of the memory-card inserting portions 8A and 8B may be formed longer, or both the conductors of the memory-card inserting portions 8A and 8B and those of the memory card 10 and the electronic device 100 may be formed longer. To prevent the memory card 10 or the electronic device 100 from being erroneously inserted, the configurations of the left portion and the right portion of the connector are asymmetrically formed.

Figure 11:
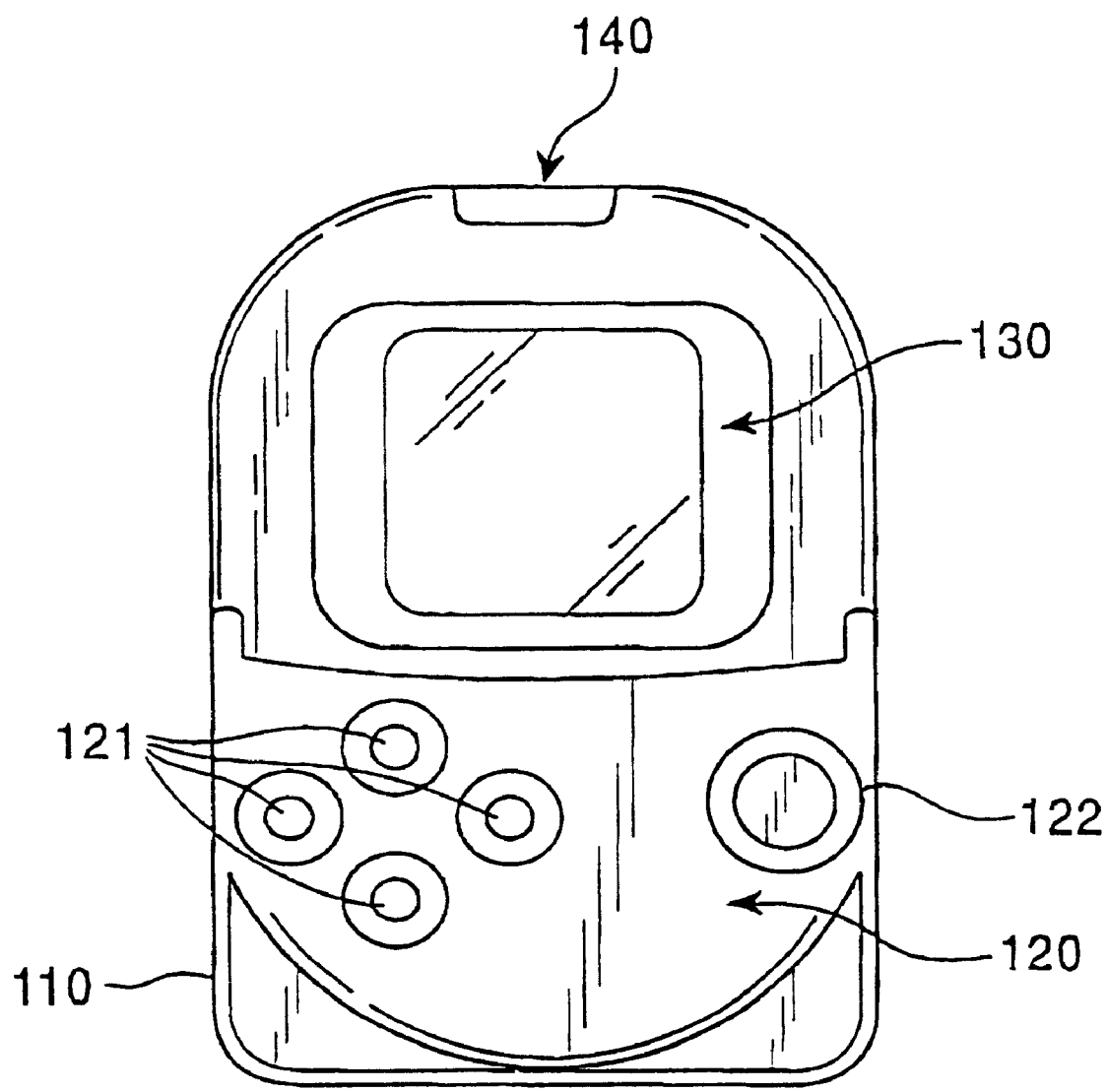
FIG. 11 is an outer plan view illustrating a portable electronic device according to an embodiment of the present invention.
Figure 12:
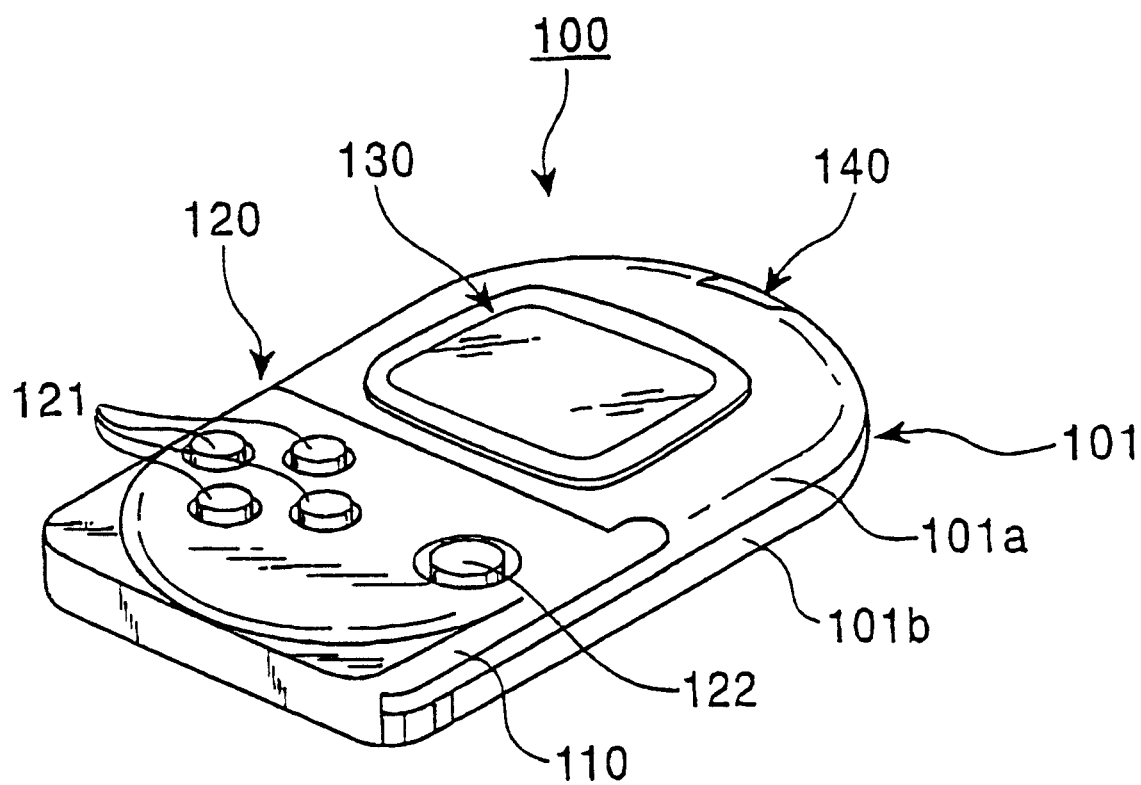
FIG. 12 is an outer perspective view illustrating the portable electronic device shown in FIG. 11.
Figure 13:
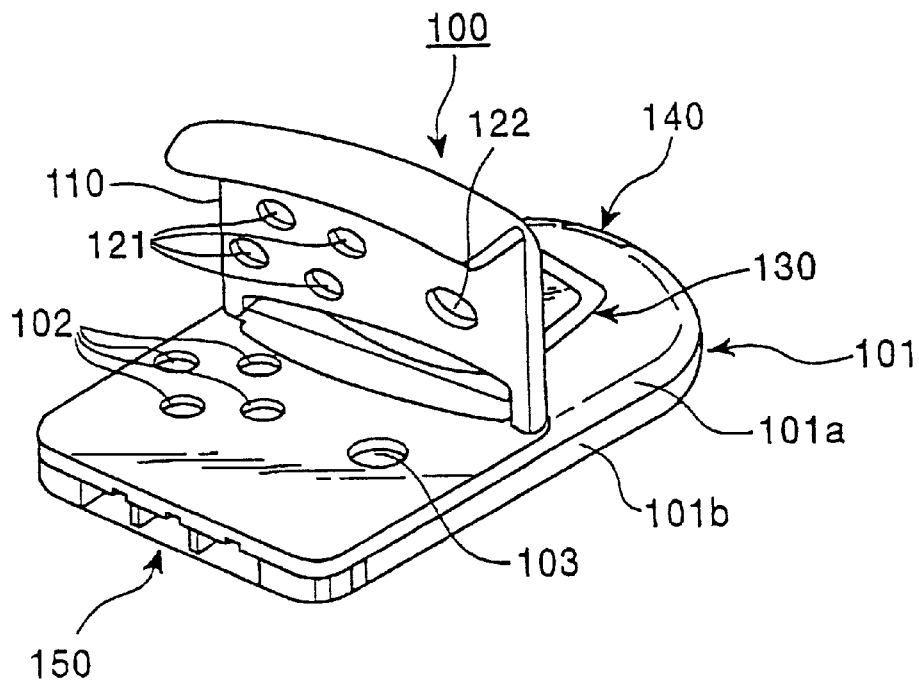
FIG. 13 is a perspective view illustrating the portable electronic device shown in FIG. 11 in a state in which a lid is closed.

FIGS. 11 through 13 are outer views of the portable electronic device 100. FIG. 11 is a plan view illustrating the portable electronic device 100. FIG. 12 is a perspective view illustrating the electronic device 100 in such a state in which a lid 110 for covering the connector is closed, and FIG. 13 is a perspective view illustrating the electronic device 100 in a state in which the lid 110 is opened.

The portable electronic device 100 is formed of, as illustrated in FIGS. 11 through 13, a housing 101, which serves as an outer casing, an operation unit 120 having a single or a plurality of operators 122 and 121, respectively, for inputting events and making various selections, a display unit 130 formed of a liquid crystal display (LCD) device, and a window portion 140 for performing wireless communications through infrared rays by using a wireless communication unit, which will be discussed later.

Figure 14:
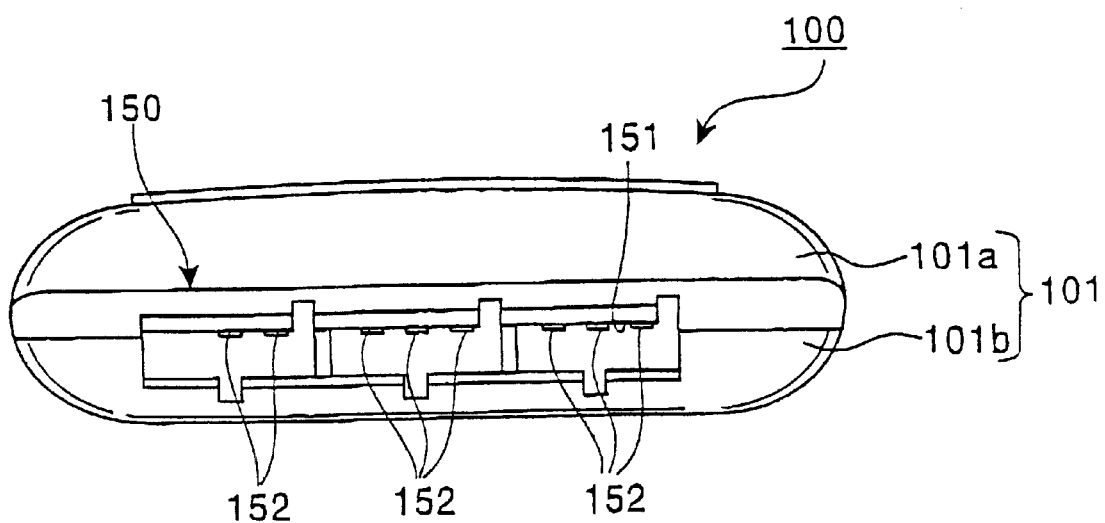
FIG. 14 is an outer bottom view illustrating the portable electronic device shown in FIG. 11.

The housing 101 is formed of, as shown in FIG. 14, an upper shell 101a and a lower shell 101b, and encapsulates a board 151 on which memory devices are mounted. The housing 101 is to be inserted into the slot 7A or 7B of the main unit of the video game machine 1, and a connector 150 having a rectangular window is provided on a lateral surface at one side of the housing 101.

The window portion 140, generally formed in a semi-circular shape, is provided at the other side of the housing 101. The display unit 130 is located in the vicinity of the window portion 140 by occupying substantially one half of the top portion of the housing 101. The operation unit 120 is provided in the vicinity of the connector 150 at the side opposite to the window portion 140, by occupying substantially the other half of the top portion of the housing 101. The operation unit 120 is formed generally in a quadrilateral shape and is pivotally supported by the housing 101. The operation unit 120 includes the lid 101 having the single or the plurality of operators 122 and 121, and switch-pressing portions 102 and 103 provided on the housing 101 under the lid 110.

The operators 121 and 122 are disposed such that they pass through the lid 110 from the upper surface to the lower surface of the lid 110. The operators 121 and 122 are movably supported by the lid 110 while popping out or pushing down with respect to the level of the upper surface of the lid 110.

The switch-pressing portions 102 and 103 are provided with pressing elements which are movably supported by the housing 101 while popping out or pushing down with respect to the level of the upper surface of the lid 101. By depressing the pressing elements from upward, pressing switches, such as diaphragm switches, disposed on the board 151 within the housing 101, are further depressed.

The switch-pressing portions 102 and 103 are located at positions corresponding to the positions of the operators 121 and 122, respectively, in the state in which the lid 110 is closed. That is, if the operators 121 and 122 are depressed from upward to the upper surface of the lid 110 in the state in which the lid 110 is closed, the corresponding pressing switches disposed within the housing 101 are further pressed via the corresponding operators of the switch-pressing portions 102 and 103.

A flexible protective sheet may be attached to the switch-pressing portions 102 and 103. This makes it possible to directly operate the pressing elements of the switch-pressing portions 102 and 103 with a finger without the interference of the operators 121 and 122, and also to prevent the entry of dust into the housing 101 from the pressing elements.

Power-supply terminals and signal terminals 152 are disposed on the board 151, as illustrated in FIG. 14, within the window of the connector 150. The configuration and the dimensions of the connector 150 are formed to be the same as those of the ordinary memory card 10.

Figure 15B:
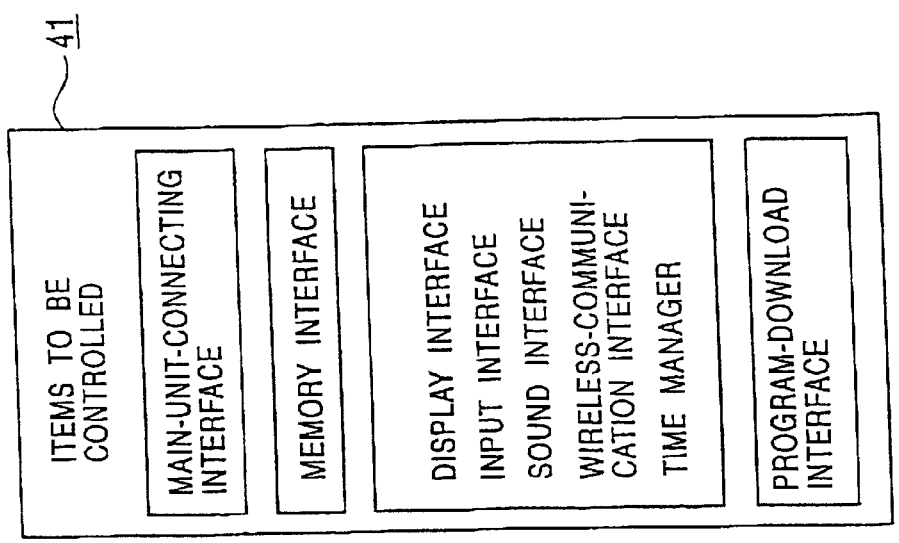
FIGS. 15A and 15B are block diagrams illustrating the configuration of the main portion of the portable electronic device shown in FIG. 11.
Figure 15A:
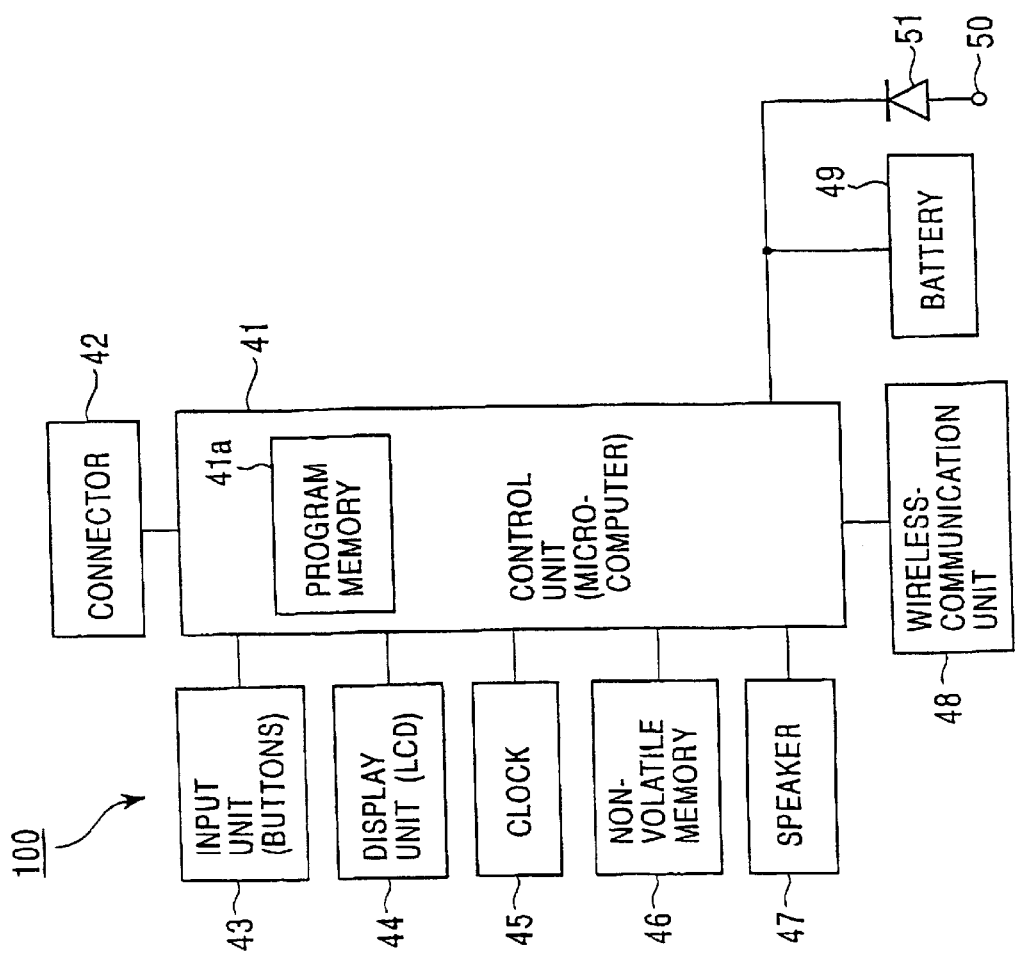

FIG. 15A is a block diagram illustrating the configuration of the main portion of the above-described portable electronic device 100.

As in the case of the aforementioned memory card 10, the portable electronic device 100 includes a control unit 41 for controlling the operation of the electronic device 100, a connector 42 for connecting the electronic device 100 to a slot of a main unit, such as an information apparatus, and a non-volatile memory 46 for storing data.

The control unit 41 is formed of, for example, a microcomputer, and includes a program memory 41a, which serves as a program storage device. As the non-volatile memory 46, a semiconductor memory device, such as a flash memory, which allows data to be retained even if power is turned off, is used. As discussed later, since the portable electronic device 100 is provided with a battery 49, a static random access memory (SRAM) for inputting and outputting data at a high speed may be used as the nonvolatile memory 46.

The portable electronic device 100 differs from the memory card 10 in that it includes an operation (event) input unit 43, operation buttons, for operating a stored program, a display unit 44, such as a liquid crystal display (LCD) device, for displaying various information according to the stored program, a wireless communication unit 48 for transmitting and receiving data to and from other memory cards through infrared rays, and the battery 49 for supplying power to the individual elements.

As stated above, since the electronic device 100 has the small built-in battery 49, which serves as a power-supply unit, it can be operated as an independent device even if it is removed from the slot 7A or 7B of the video game machine 1. As the battery 49, a rechargeable secondary cell may be used. When the portable electronic device 100, which serves as a sub-unit, is fitted in the slot 7A or 7B of the video game machine 1, which serves as a main unit, power is supplied to the electronic device 100 from the video game machine 1. More specifically, a power-supply terminal 50 is connected to the connecting terminal of the battery 49 via a reverse-flowing preventing diode 51. Accordingly, when the electronic device 100 is inserted into the slot 7A or 7B of the main unit, such as the video game machine 1, power is supplied from the main unit to the sub-unit, and a secondary cell, if it is used, is recharged.

The portable electronic device 100 further includes a clock 45, and a speaker 47, which serves as a sound generator, for generating sound according to the program. All of the above-described elements are connected to the control unit 41 and are operated under the control of the control unit 41.

FIG. 15B illustrates items to be controlled by the control unit 41. As stated above, the control unit 11 of the conventional memory card 10 includes only a main-unit-connecting interface for connecting the memory card 10 to the main unit, such as the information apparatus, and a memory interface for inputting and outputting data. In contrast, the portable electronic device 100 of this embodiment is provided with not only the above-described interfaces, but also a display interface, an operation input interface, a sound interface, a wireless-communication interface, a time manager, and a program-download interface.

In this manner, according to the portable electronic device 100, the control unit (microcomputer) 41 has interfaces (drivers) for managing the functions implemented by this embodiment, in addition to the conventional functions, i.e., the main-unit connecting interface and the memory interface. Thus, the electronic device 100 of this embodiment is compatible with the conventional functions.

Additionally, since the portable electronic device 100 includes the input unit 43, such as button switches, for operating a program to be executed, and the display unit 44 formed of the LCD device, it may find extensive use as a portable game machine if a game application runs on the electronic device 100.

The portable electronic device 100 also has a function of storing, in the program memory 41a of the control unit 41, a program for downloading an application program from the main unit of the video game machine 1. It is thus easy to update application programs running on the electronic device 100 and various driver software programs.

As described above, the operation of the portable electronic device 100 can be controlled separately from the video game machine 1. Accordingly, data can be created from an application stored in the program memory 41a, which serves as a program storage device, independently of an application of the video game machine 1. The data created in the electronic device 100 may be transmitted to the video game machine 1, thereby establishing a cooperative operation (link) between the electronic device 100 and the video game machine 1.

Since the clock 45 is provided for the electronic device 100, time data can be shared with the video game machine 1. That is, it is possible to match the time data of the electronic device 100 and the video game machine 1, and it is also possible to share data for controlling, based on the real time, the progresses of games which are independently executed by both units.

Specific examples of the above-described cooperative operation between the video game machine 1 and the portable electronic device 100 will be discussed later.

Figure 16:
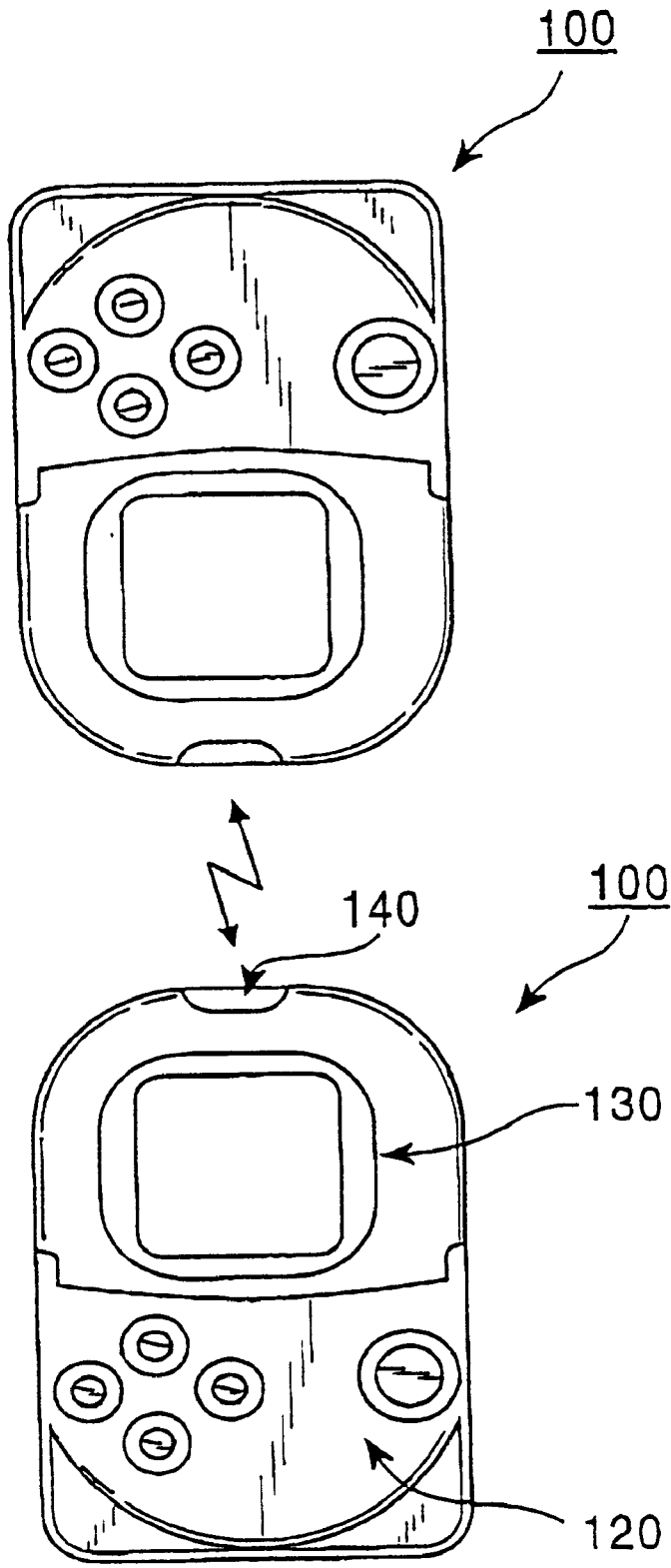
FIG. 16 illustrates a wireless-communication function possessed by the portable electronic devices shown in FIG. 11.

FIG. 16 schematically illustrates wireless communications performed between the portable electronic devices 100. One electronic device 100 transmits and receives data to and from the other electronic device 100 by using the wireless-communication unit 48 through infrared rays via the window portions 140, which serve as wireless communication windows, thereby exchanging internal data between a plurality of memory cards. The above-mentioned internal data includes data transferred from an information apparatus, such as the video game machine 1, and stored in a storage device within the memory card 10.

In the foregoing embodiment, the portable electronic device 100 is used as an auxiliary storage device of the video game machine 1. However, the electronic device 100 is not limited to the video game machine 1, and may find extensive use in searching for various types of information.

One example of the aforementioned cooperative operation between the portable electronic device 100 and the video game machine 1 is as follows.

As stated above, the electronic device 100 is able to share the following data with the video game machine 1: the game data created by the control unit (microcomputer) 41, the time data obtained by the clock 45 within the memory card 10, and the data created by another memory card and obtained through the wireless communication unit 48.

Figure 17:
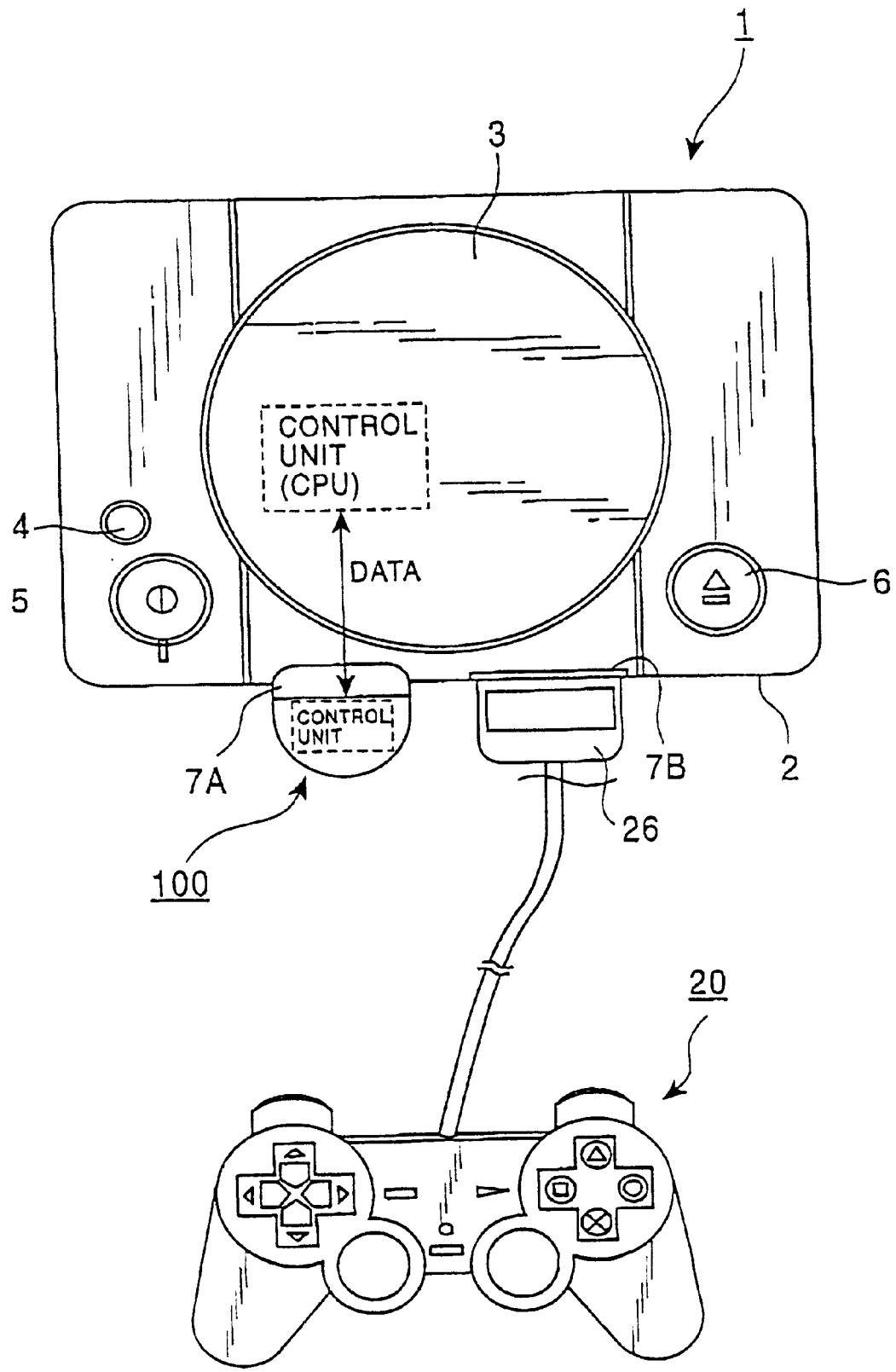
FIG. 17 illustrates a cooperative operation performed between the portable electronic device shown in FIG. 11 and the video game machine shown in FIG. 7.

FIG. 17 schematically illustrates the cooperative operation performed between the video game machine 1, which serves as a main unit, and the portable electronic device 100, which serves as a sub-unit.

The following cooperative operation is described by way of example. An optical disc (CD-ROM), which is a recording medium for recording an application software program, is loaded in the video game machine 1, and the program read from the optical disc by the video game machine 1 is downloaded to the portable electronic device 100 fitted into the slot 7A or 7B of the video game machine 1.

Prior to a specific explanation of the cooperative operation, the downloading of the program, which is performed for the cooperative operation, is discussed below.

Figure 18:
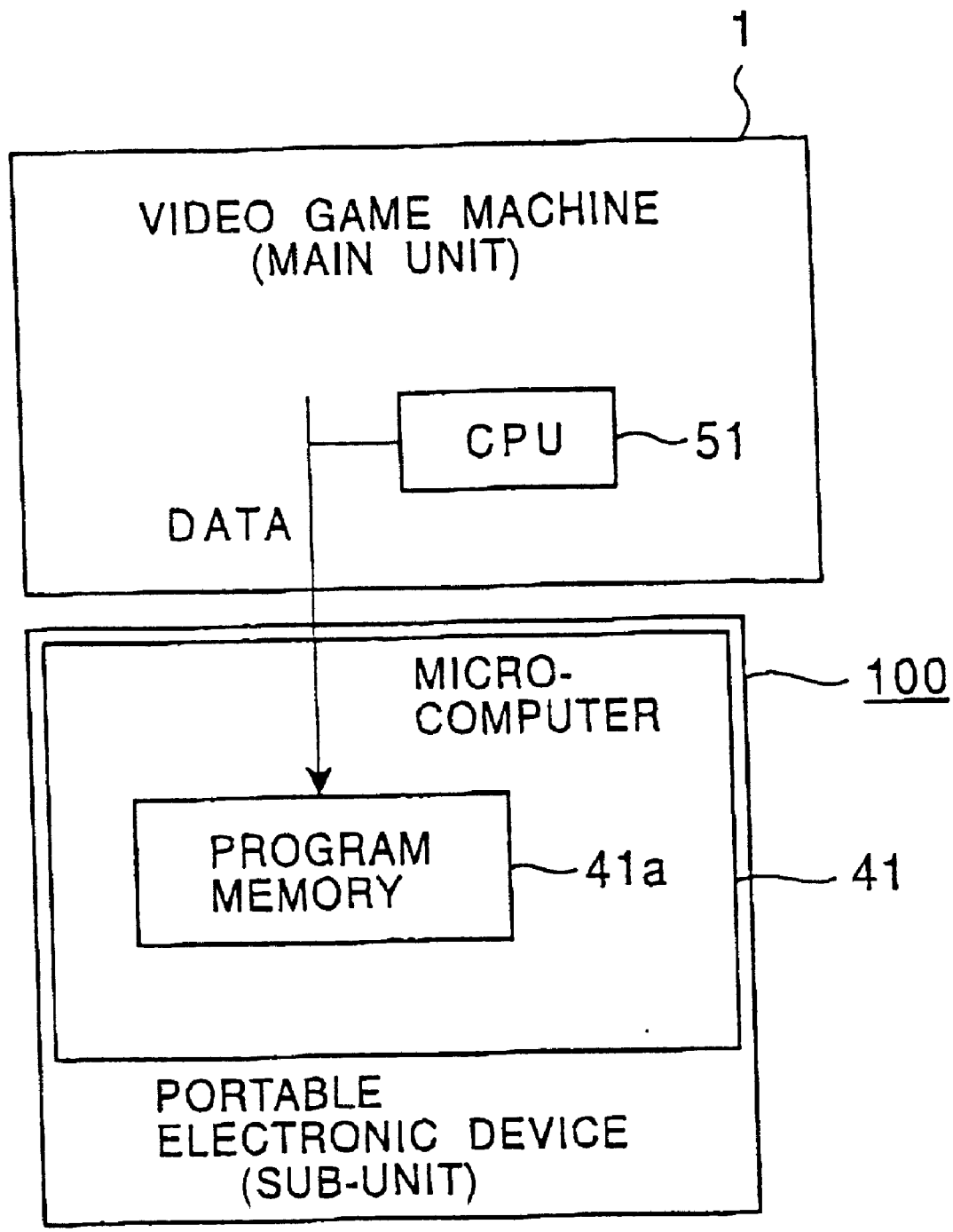
FIG. 18 illustrates a flow of program data to be downloaded from the video game machine shown in FIG. 7 to a memory card.

FIG. 18 illustrates the data flow generated when a video-game application program supplied from the optical disc (CD-ROM) loaded in the disk-loading portion 3 of the video game machine 1 is directly transferred (downloaded) to the program memory 41a within the control unit 41 of the electronic device 100 via the CPU 51 of the game machine 1.

Figure 19:
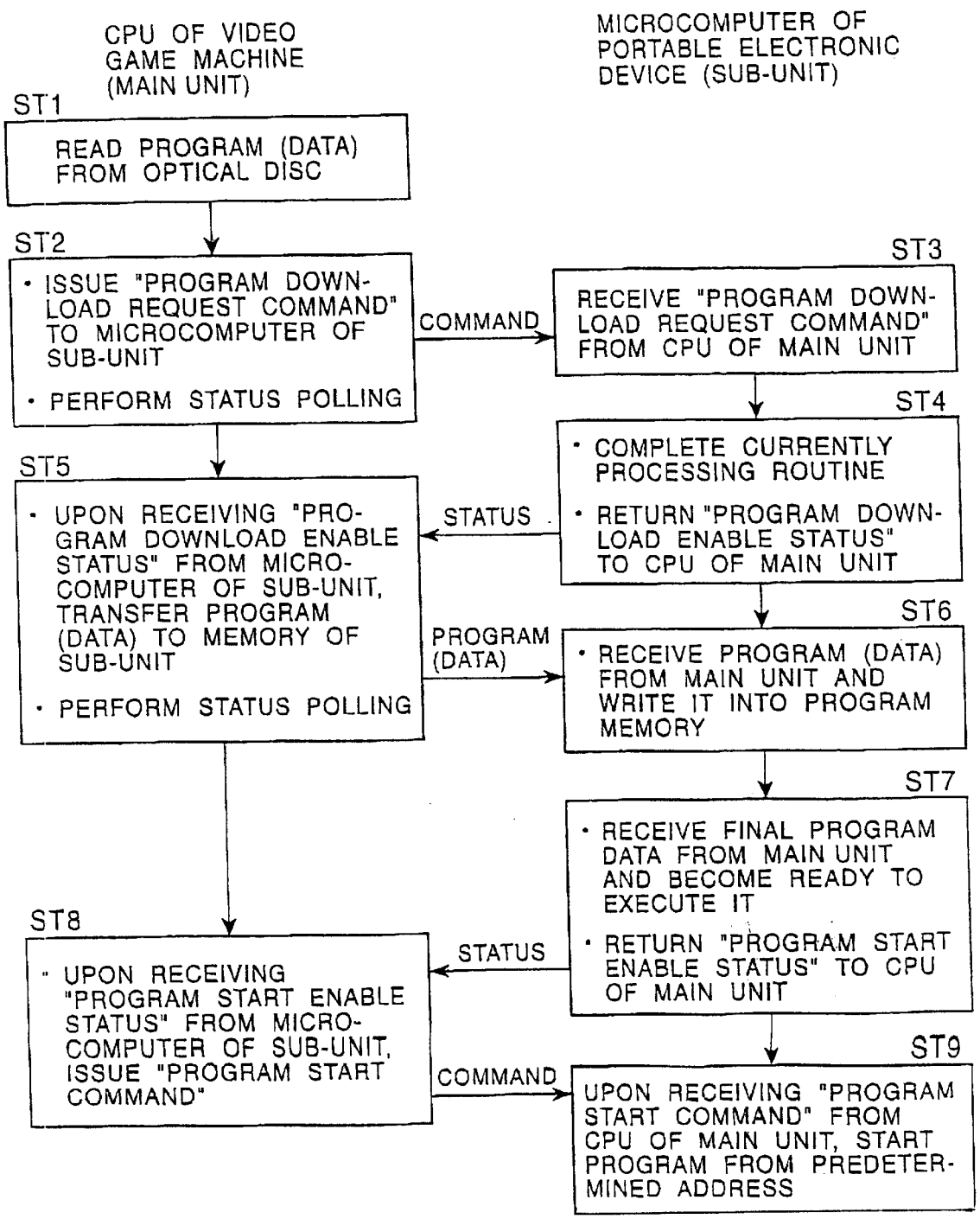
FIG. 19 illustrates the procedure of the downloading operation show in FIG. 18.

FIG. 19 illustrates the procedure of the downloading operation shown in FIG. 18. In step ST1, the video-game application program, which is to run on the microcomputer 41 of the portable electronic device 100 (hereinafter sometimes simply referred to the "sub-unit"), is read as data from the CD-ROM loaded in the disk-loading portion 3 of the video game machine 1 (hereinafter sometimes simply referred to as the "main unit"). As stated above, generally, the above-mentioned application program is different from that operated on the video game machine 1.

Then, in step ST2, the CPU 51 of the main unit issues a "program download request command" to the microcomputer 41 of the portable electronic device 100. The CPU 51 then performs polling so as to receive a "program download enable status" from the microcomputer 41. The polling is to make a query if there is any request from the sub-unit and, if any, executes the corresponding processing.

In step ST3, the microcomputer 41 of the sub-unit receives the "program download request command" from the CPU 51 of the main unit.

Subsequently, in step ST4, when the microcomputer 41 of the sub-unit completes the currently processing routine and becomes ready for downloading the program, it returns the "program download enable status" to the CPU 51 of the main unit.

In step ST5, upon receiving the "program download enable status" from the microcomputer 41 of the sub-unit, the CPU 51 of the main unit transfers (downloads) and writes the program read from the CD-ROM in step ST1 into the program memory 41a of the sub-unit. The CPU 51 then performs polling so as to receive a "program start enable status" from the microcomputer 41.

The address of the program memory 41a into which the downloaded data is to be written is managed by the microcomputer 41. Although in the foregoing description the program downloaded from the main unit is stored in the program memory 41a of the microcomputer 41, it may be stored in a storage device, such as an SRAM, for inputting and outputting data at a high speed.

In step ST6, the microcomputer 41 receives the program transferred from the main unit as data and writes it into the program memory 41a. It appears to the CPU 51 of the main unit that the program data is directly written into the program memory 41a of the sub-unit from the main unit. As stated above, the address of the program memory 41a is managed by the microcomputer 41.

Thereafter, in step ST7, when the microcomputer 41 of the sub-unit receives the final program data and becomes ready to execute it, it returns a "program start enable status" to the CPU 51 of the main unit.

In step ST8, upon receiving the "program start enable status" from the microcomputer 41 of the sub-unit, it issues a "program start command".

In step ST9, when the microcomputer 41 receives the "program start command" from the CPU 51 of the main unit, it starts the program from the predetermined address.

According to the foregoing procedure, the application program is directly transferred (downloaded) from the video game machine 1 to the program memory 41a within the microcomputer 41 of the electronic device 100 fitted in the main unit.

As discussed above, means for supplying the application program is not restricted to a recording medium, such as an optical disc. The application program may be supplied via a communication network. In this case, only step ST1 of the foregoing procedure differs from that described above.

According to the above-described downloading procedure, the application program is directly downloaded from the video game machine 1 to the program memory 41a within the microcomputer 41 of the electronic device 100 fitted in the game machine 1.

In contrast, the CPU 51 of the main unit may download the application-program data to the non-volatile memory 46 of the sub-unit, and then, the sub-unit may copy the data from the non-volatile memory 46 into the program memory 41a of the microcomputer 41 and execute it.

Figure 20:
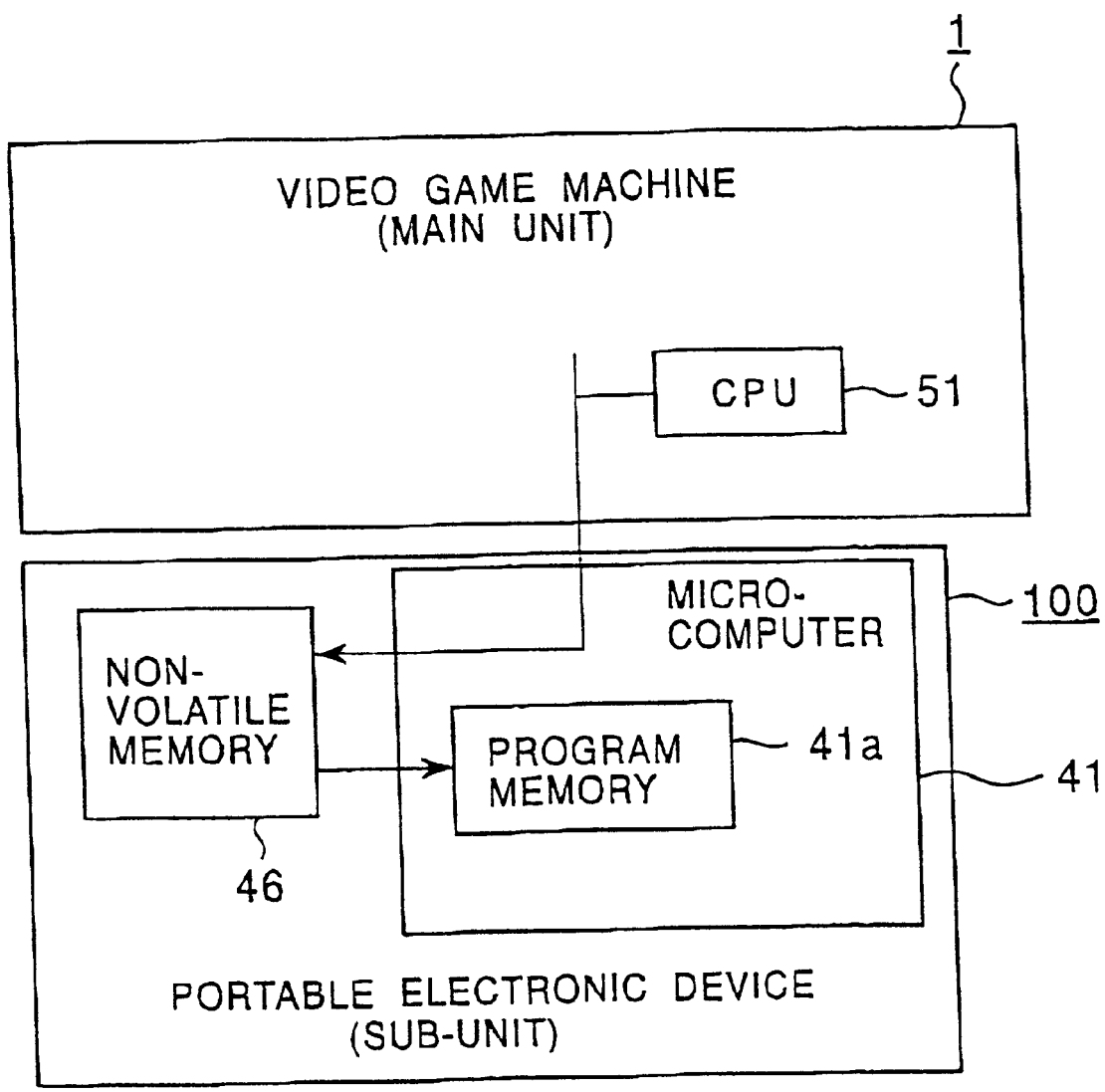
FIG. 20 illustrates another flow of program data to be downloaded from the video game machine shown in FIG. 7 to a memory card.

FIG. 20 illustrates the data flow created according to the above procedure. More specifically, the video-game application program read from an optical disc loaded in the disk-loading portion 3 of the video game machine 1 is transferred (downloaded) to the non-volatile memory 46 of the portable electronic device 100 via the CPU 51 of the game machine 1. Then, the downloaded data is copied from the non-volatile memory 46 to the program memory 41a of the microcomputer 41 and is executed.

Figure 21:
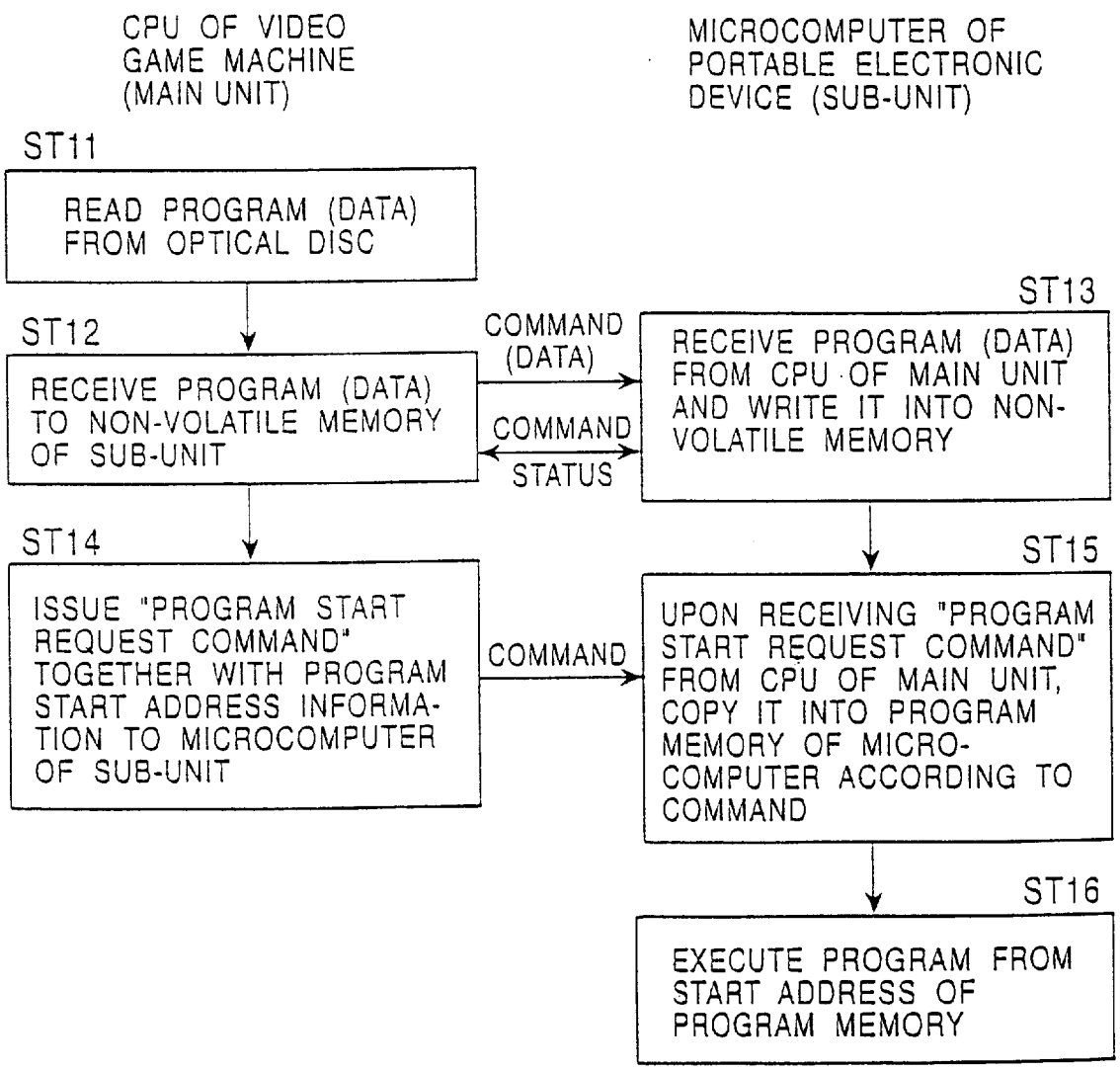
FIG. 21 illustrates the procedure of the downloading operation shown in FIG. 20.

FIG. 21 illustrates the above-described downloading procedure. In step ST11, the video-game application program, which is to run on the microcomputer 41 of the sub-unit, is read as data from the CD-ROM loaded in the disk-loading portion 3 of the main unit.

Then, in step ST12, the CPU 51 of the main unit transfers (downloads) the program data into the non-volatile memory 46 of the sub unit. This procedure is similar to that of backing up data by a conventional video game machine.

In step ST13, the microcomputer 41 of the sub unit receives as data the application program transferred from the CPU 51 of the main unit in a manner similar to the conventional data back-up procedure, and writes it into the non-volatile memory 46.

Subsequently, in step ST14, the CPU 51 issues a "program start request command" together with program start address information to the microcomputer 41 of the sub unit.
In step ST15, upon receiving the "program start request command" from the CPU 51, the microcomputer 41 copies the designated size of data from the address of the non-volatile memory 46 specified by the above command into the program memory 41a of the microcomputer 41.

In step ST16, the microcomputer 41 then executes the program from the start address of the program memory 41a.

According to the foregoing procedure, the application program is transferred (downloaded) as data from the video game machine 1 to the program memory 41a within the microcomputer 41 of the sub-unit fitted in the main unit via the non-volatile memory 46.

Generally, the application program downloaded from the video game machine 1 to the portable electronic device 100 is different from that running on the video game machine 1. An application program running on both the video game machine 1 and the electronic device 100 may be downloaded to the electronic device 100. This, however, is subject to a restriction such that the CPU 51 of the video game machine 1 and the microcomputer 41 of the electronic device 100 should be the same processor.

A description is now given below of an example of the cooperative operation in which the application software program downloaded from the video game machine 1 by the above-described procedure is executed on the portable electronic device 100 and the executed result is again sent back to the video game machine 1.

In this example, attribute data of human characters and item images appearing in a roll-playing game which runs on the video game machine 1 is downloaded to the portable electronic device 100. The above-mentioned attribute data is data representing the degree of growth, personalities, etc.

The human characters and item images can be grown on the program running on the microcomputer 41 of the sub-unit, thereby changing the attributes of the characters and item images, independently of a program running on the video game machine 1.

In this manner, the above-described electronic device 100 can be operated on its own, and also, it is compact and portable. This enables a user (game player) to carry the electronic device 100 and to grow the human characters and item images at any time by using the program running on the sub-unit. The user is also able to transfer (upload) the attributes of the human characters and item images grown on the electronic device 100 to the video game machine 1. In this case, the human characters and item images having the updated attributes can be incorporated into the program running on the video game machine 1 and then executed.

As discussed above, the attribute data of the human characters and item images can be shared and exchanged between the video game machine 1 and the portable electronic device 100. It is thus possible to form a video game that allows both the video game machine 1 and the electronic device 100 to perform the cooperative operation.

Figure 22A:
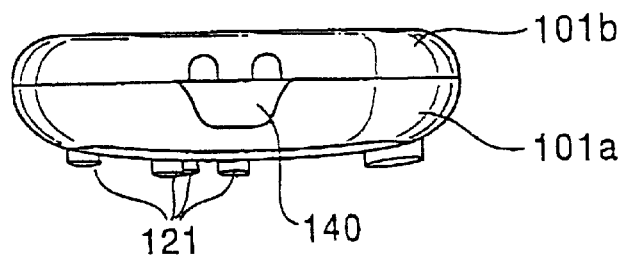
FIG. 22A is a front view of the portable electronic device shown FIG. 11.
Figure 22B:
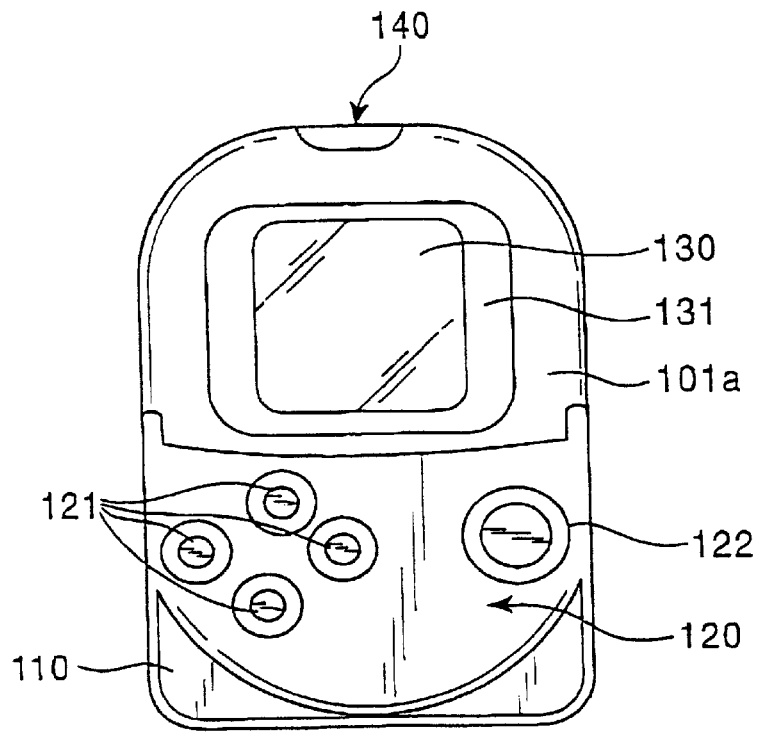
FIG. 22B is a top view of the device.
Figure 22C:
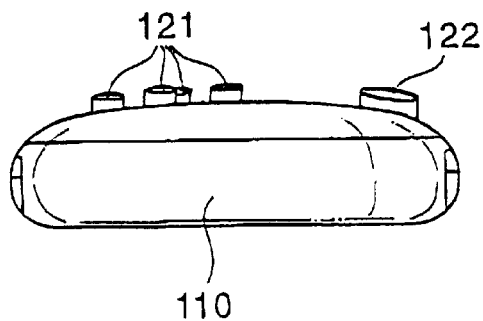
FIG. 22C is a bottom view of the device.
Figure 23:
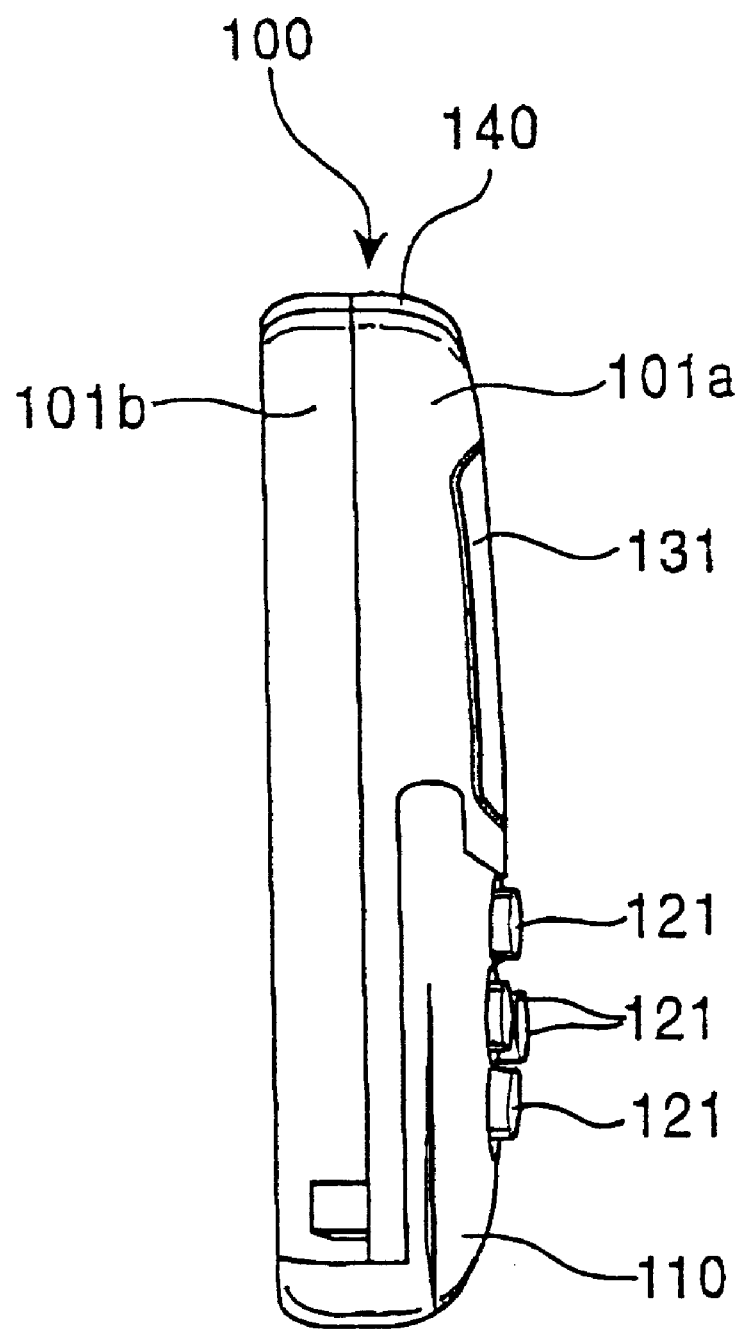
FIG. 23 is an outer side view illustrating the portable electronic device shown in FIG. 11 from the right side.
Figure 24:
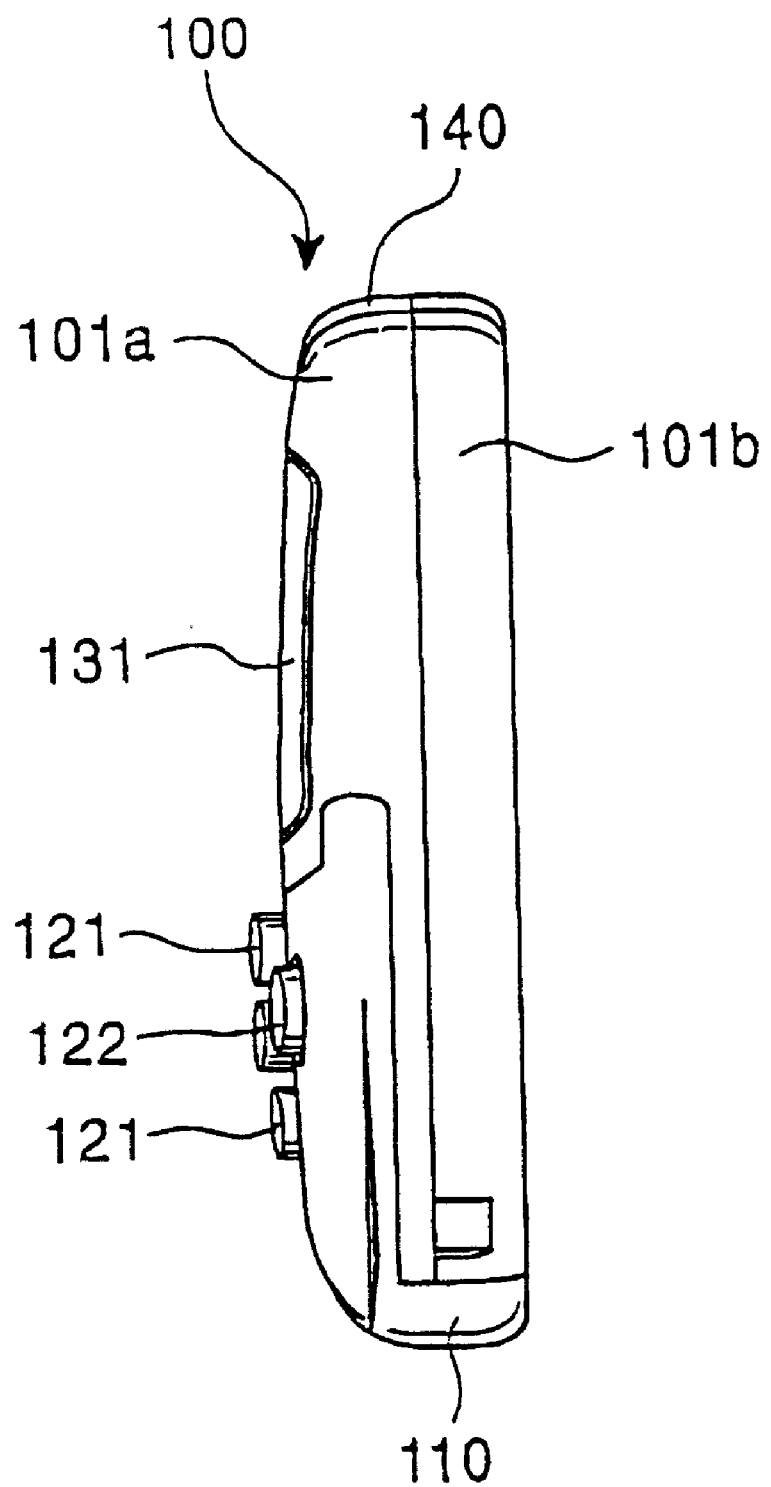
FIG. 24 is an outer side view illustrating the portable electronic device shown in FIG. 11 from the left side.
Figure 25:
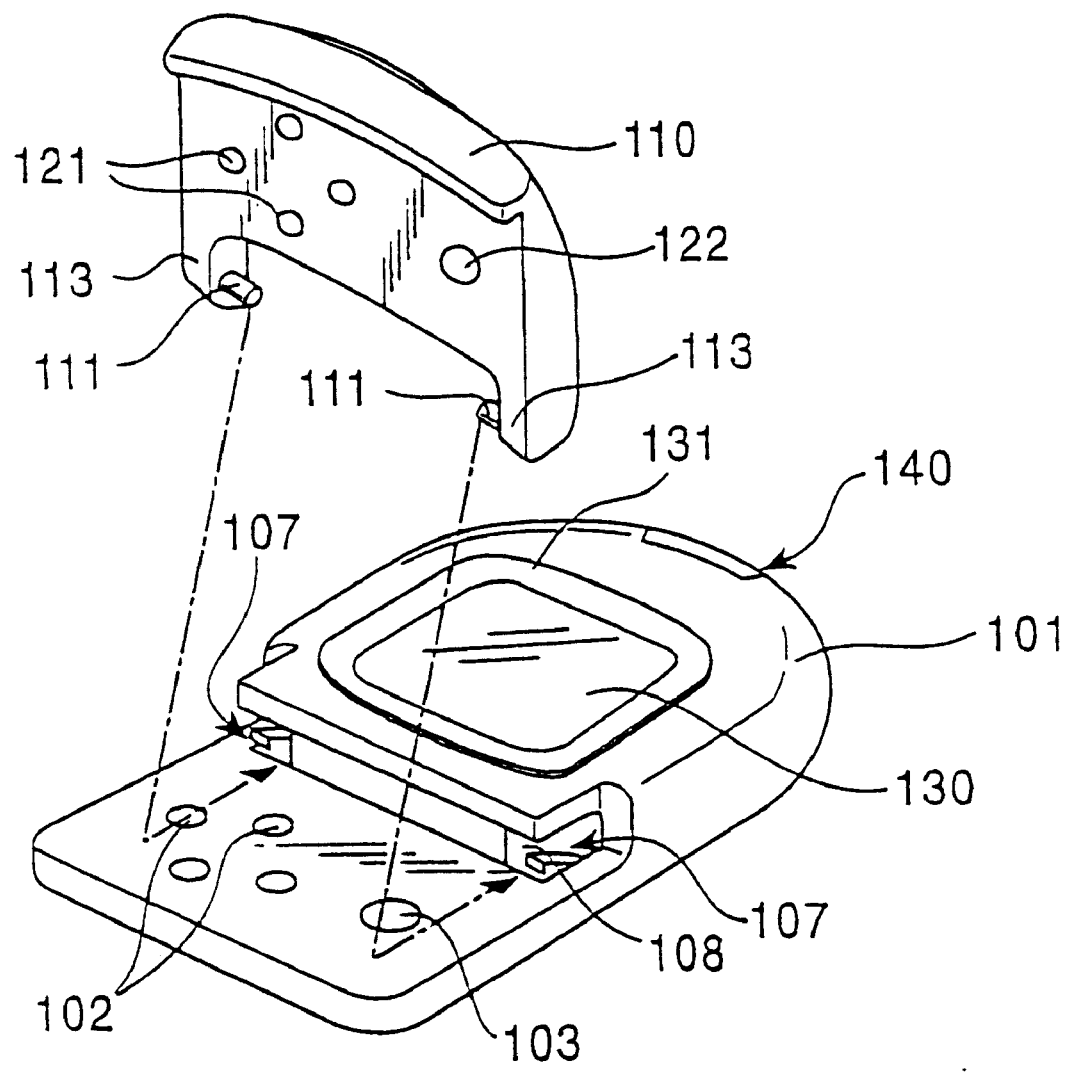
FIG. 25 is a perspective view illustrating the portable electronic device shown in FIG. 11 in a state in which a lid is detached.
Figure 26:
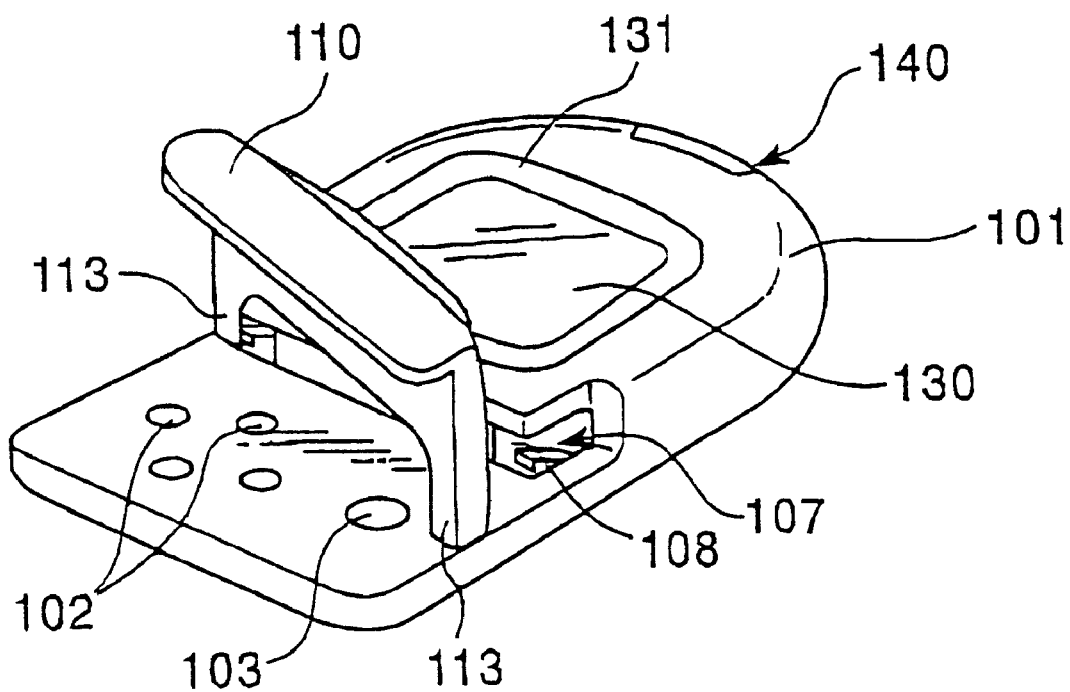
FIG. 26 is a perspective view illustrating the portable electronic device shown in FIG. 11 in a state in which the lid is removing from the device.

The portable electronic device 100 is accommodated within the housing 101 and has the terminals 152 for connecting the device 100 to external apparatuses. Although the terminals 152 face outward via the connector 150, which is formed as an aperture, provided for the housing 101, it is covered and protected by the lid 110, as shown in FIGS. 22A through 24. FIGS. 22A through 24 illustrate the portable electronic device 100: FIG. 22A is a top view, FIG. 22B is a front view, FIG. 22C is a bottom view, FIG. 23 is a side view from the right side, and FIG. 24 is a side view from the left side. The lid 110 is attachable to and detachable from the housing 101, as shown in FIGS. 25 and 26. Details will be described later.

Figure 27:
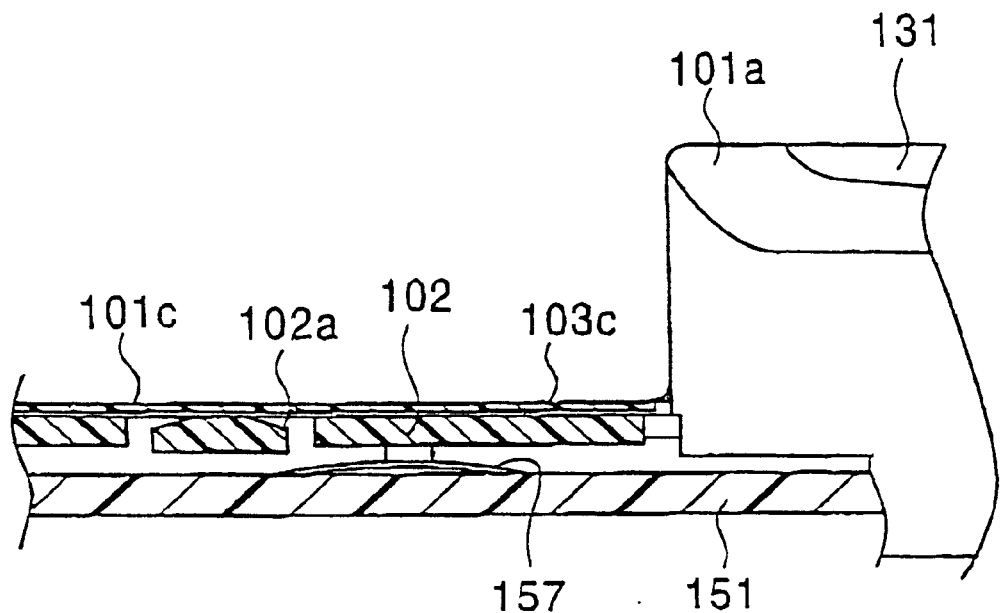
FIG. 27 is a sectional view illustrating one example of the configuration of pressing portions for use in the portable electronic device shown in FIG. 11.

As stated above, the housing 101 is provided with, as shown in FIG. 27, pressing elements forming the pressing portions 102 and 103. When being depressed, the pressing portions 102 and 103 press a pressing switch 157 mounted on the board 151 and connected to an electronic circuit.

Figure 28:
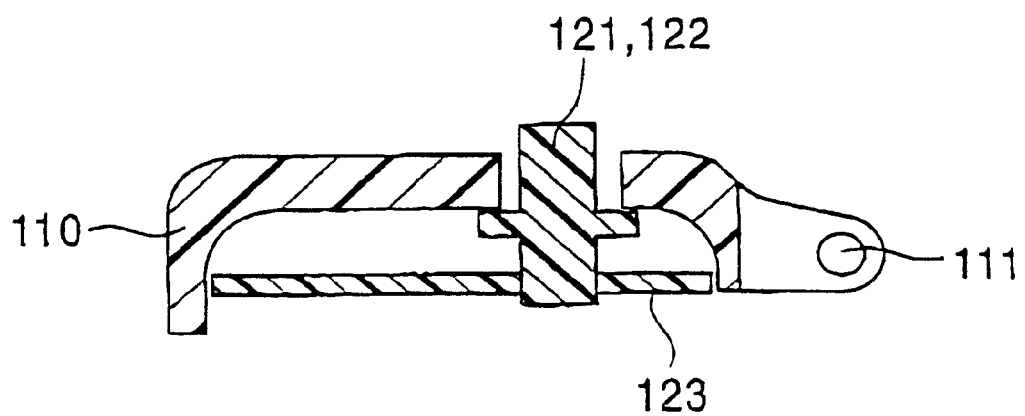
FIG. 28 is a plan view illustrating the configuration of operator formed on a lid for use in the portable electronic device shown in FIG. 11.
Figure 29:
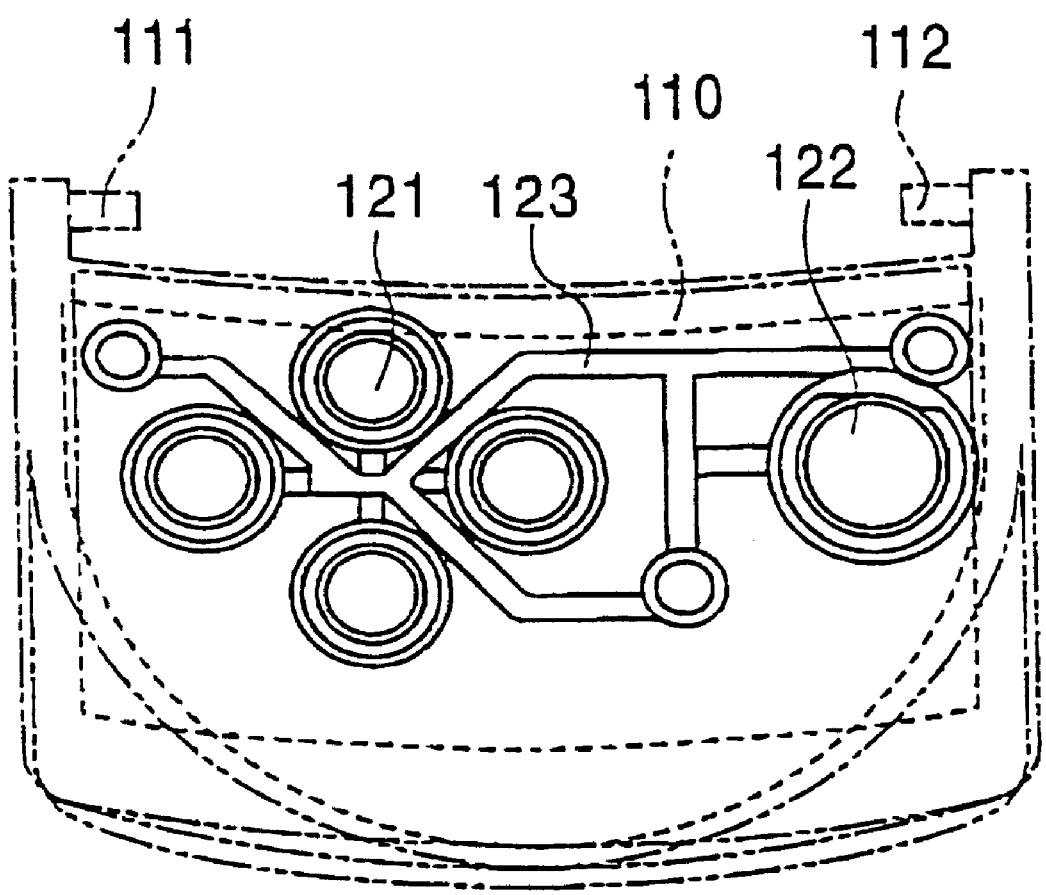
FIG. 29 is a plan view illustrating the configuration of the operators formed on the lid for use in the portable electronic device shown in FIG. 11.

The operators 121 and 122 are provided for, as shown in FIG. 28, the lid 110 in such a manner that they pass through the lid 110. The operators 121 and 122 are movably supported by the lid 110 and are located at the positions corresponding to the positions of the pressing portions 102 and 103, respectively, when the lid 110 is closed. The operators 121 and 122 are formed of a flexible material, such as a synthetic resin and are integrally provided, as shown in FIG. 29, via a runner 123. The operators 121 and 122 are movably supported by the lid 110. That is, when the operators 121 and 122 are pressed when the lid 110 is closed, they further depress the pressing switch 157 via the pressing elements of the pressing portions 102 and 103, respectively.

Figure 30:
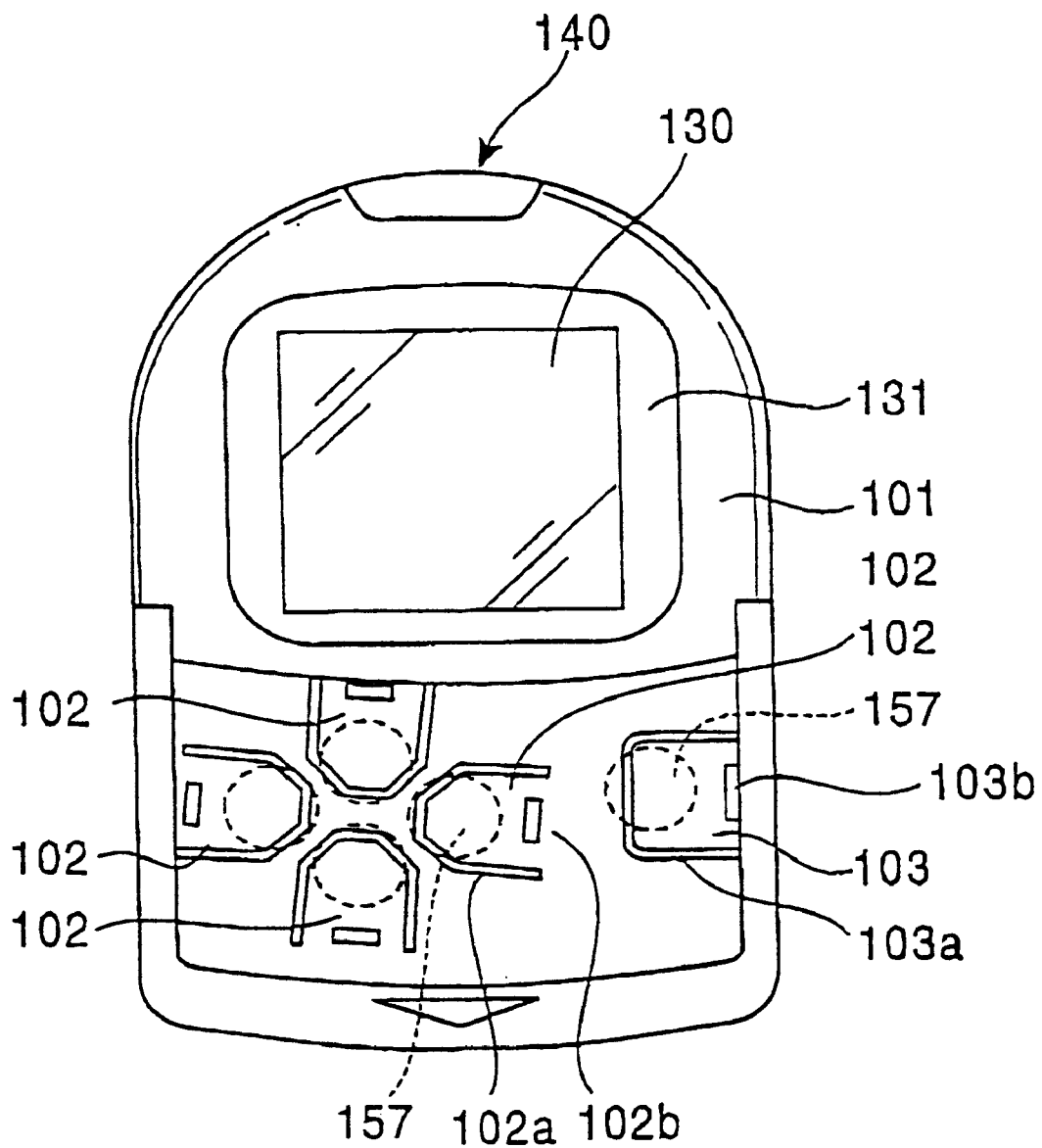
FIG. 30 As a plan view illustrating another example of the configuration of the pressing portions for use in the portable electronic device shown in FIG. 11.

The pressing elements of the pressing portions 102 and 103 may be formed of a material different from the material forming the housing 101, or may be formed of part of the outer plate of the housing 101, as shown in FIGS. 27 and 30. In this case, the portions surrounded by angular-U-shaped notches 102a and 103a formed in the outer plate of the housing 101 serve as the pressing elements. Slits 102b and 103b are provided at the ends of the pressing elements, so that the pressing elements are elastically displaceable with respect to the housing 101. A flexible protective sheet 103c is attached to the top surface of the pressing elements. It is thus possible to directly press the pressing elements of the switch pressing portions 102 and 103 with a finger through the protective sheet without the interference of the operators 121 and 122. The entry of dust into the housing 101 from the pressing elements can also be prevented.

When the lid 110 is opened, part of the housing 101 including the connector 50 is inserted into the slot 7A or 7B, as shown in FIG. 9, which is a recessed holding portion of an external apparatus, such as the video game machine 1, thereby connecting the terminal 152 to the video game machine 1.

Figure 31:
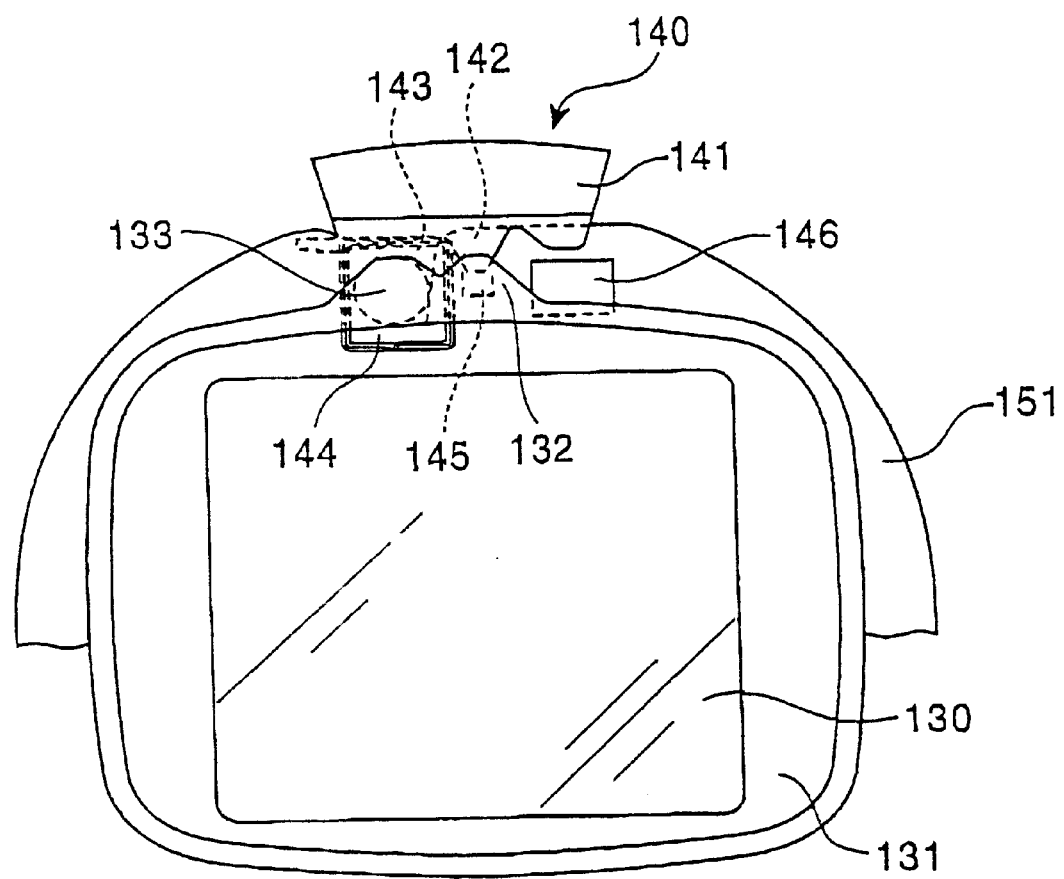
FIG. 31 is a plan view illustrating the configuration of an infrared transmitter/receiver for use in the portable electronic device shown in FIG. 11.

The portable electronic device 100 has an optical system, as shown in FIG. 31, for splitting light from a display light source (light-emitting diode (LED)) 145, which emits visible light, into two directions and for allowing a light-receiving device 144 to receive the infrared rays from the two directions. The light-receiving device 144 receives infrared rays for infrared communications between the electronic device 100 and the video game machine 1.

The two directions into which the display light source 145 directs the light and from which the light-receiving device 144 receives the infrared rays are the window portion 140 and the display unit 130. The window portion 140 is provided on the top edge of the housing 101, and is used for emitting infrared rays outward from an infrared light source (LED) 146 for performing infrareds communications with an external apparatus, such as the video game machine 1.

The optical system is formed of a transparent protective sheet 131 for protecting the display unit 130, and a prism 141, which is an optical device, provided for the window portion 140. As stated above, the display unit 130, i.e., the LCD, is disposed within the housing 101, and faces outward from the housing 101 via the aperture provided at the front side of the housing 101. The transparent protective sheet 131 is formed of a transparent material, such as an acrylic material, and is disposed to cover the aperture.

The prism 141 is also formed of a transparent material, such as an acrylic material, and is disposed to cover the window portion 140. The display unit 130 is provided at the front side of the housing 101, and faces in a direction different from the window portion 140 provided at the upper edge of the housing 101.

The infrared light source 146, the display light source (LED) 145, and the light-receiving device 144 are positioned farther upward than the display unit 130 and are disposed on the board 151 within the housing 101, the above-mentioned elements being substantially aligned.

Figure 32:
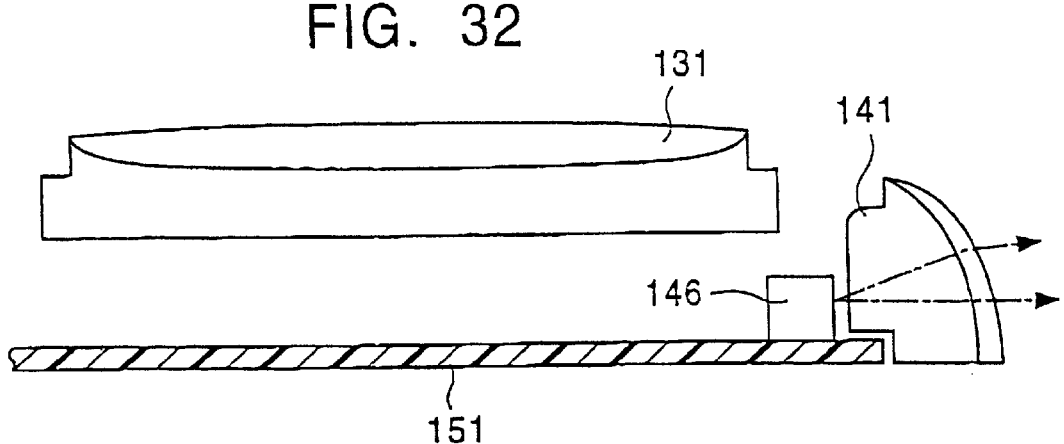
FIG. 32 is a sectional view illustrating the configuration of an infrared transmitter/receiver for use in the portable electronic device shown in FIG. 11.

The prism 141 directs, as shown in FIG. 32, the infrared rays emitted from the infrared light source 146 to the window portion 140 and further to the exterior of the housing 101.

Figure 33:
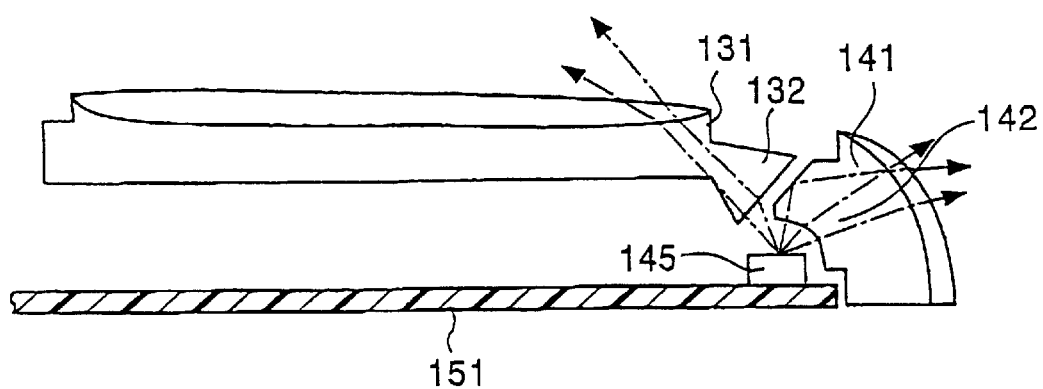
FIG. 33 is a sectional view illustrating the configuration of a display visible-light emitting portion for use in the portable electronic device shown in FIG. 11.

The prism 141 is also provided with, as shown in FIG. 33, a projection 142. The projection 142 reflects at the interface the visible light emitted from the display light source 145 and directs the light to the window portion 140 and emits it outward via the window portion 140. After passing through the projection 142, the visible light is incident on the transparent protective sheet 131 via a projection 132 provided for the protective sheet 131 and is emitted to the exterior of the display unit 130 via the protective sheet 131. In this manner, the window portion 140 directs not only the infrared rays emitted from the infrared light source 146, but also the visible light emitted from the display light source 145, to the exterior of the housing 100.

Figure 34:
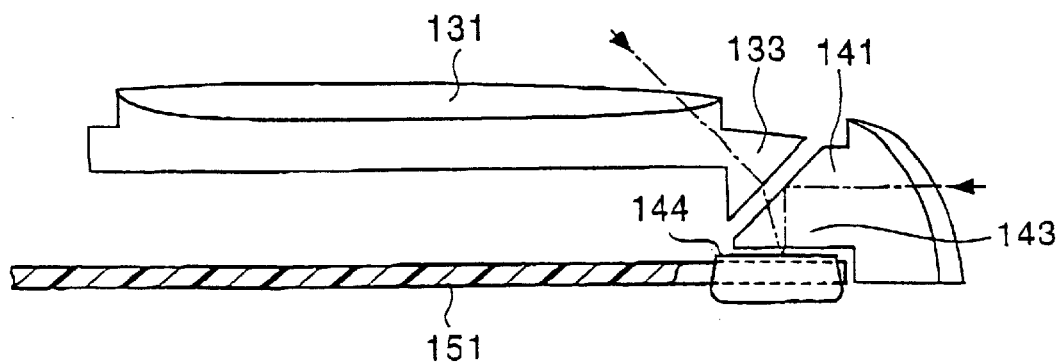
FIG. 34 is a sectional view illustrating the configuration of an infrared receiver for use in the portable electronic device shown in FIG. 11.

The prism 141 has a projection 143, as shown in FIG. 34, for reflecting the infrared rays from the window portion 140 at the interface and directing them to the light-receiving device 144. The light is then received by the light-receiving device 144. The infrared rays incident on the transparent protective sheet 131 from the display unit 130 impinge into the projection 143 of the prism 141 via a projection 133 provided for the transparent protective sheet 131, and are received by the light-receiving device 144 via the projection 143. In this manner, the light-receiving device 144 receives the infrared rays coming from two directions, i.e., from the display unit 130 and from the window portion 140.

Figure 35:
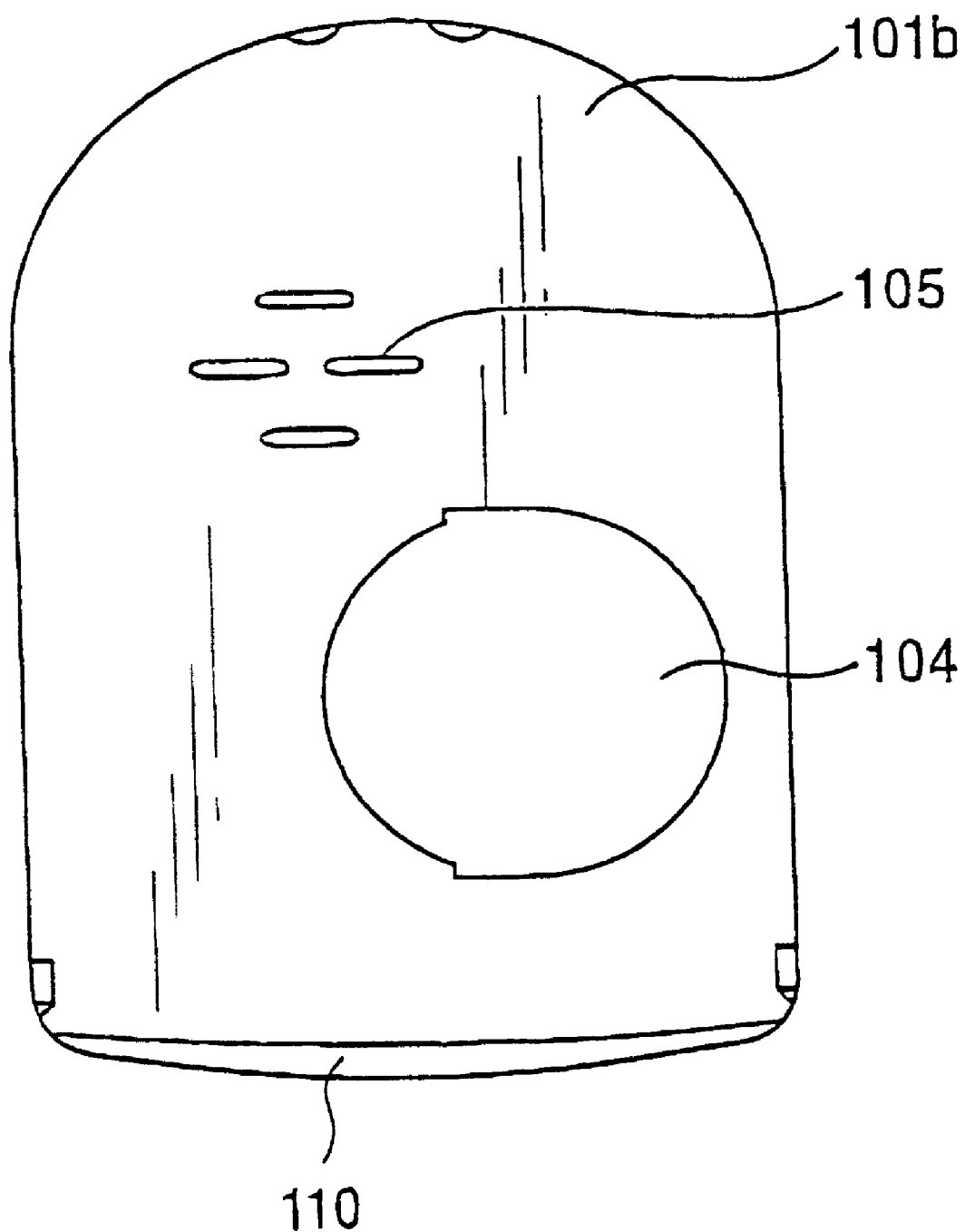
FIG. 35 is an outer rear view illustrating the portable electronic device shown in FIG. 11.
Figure 36:
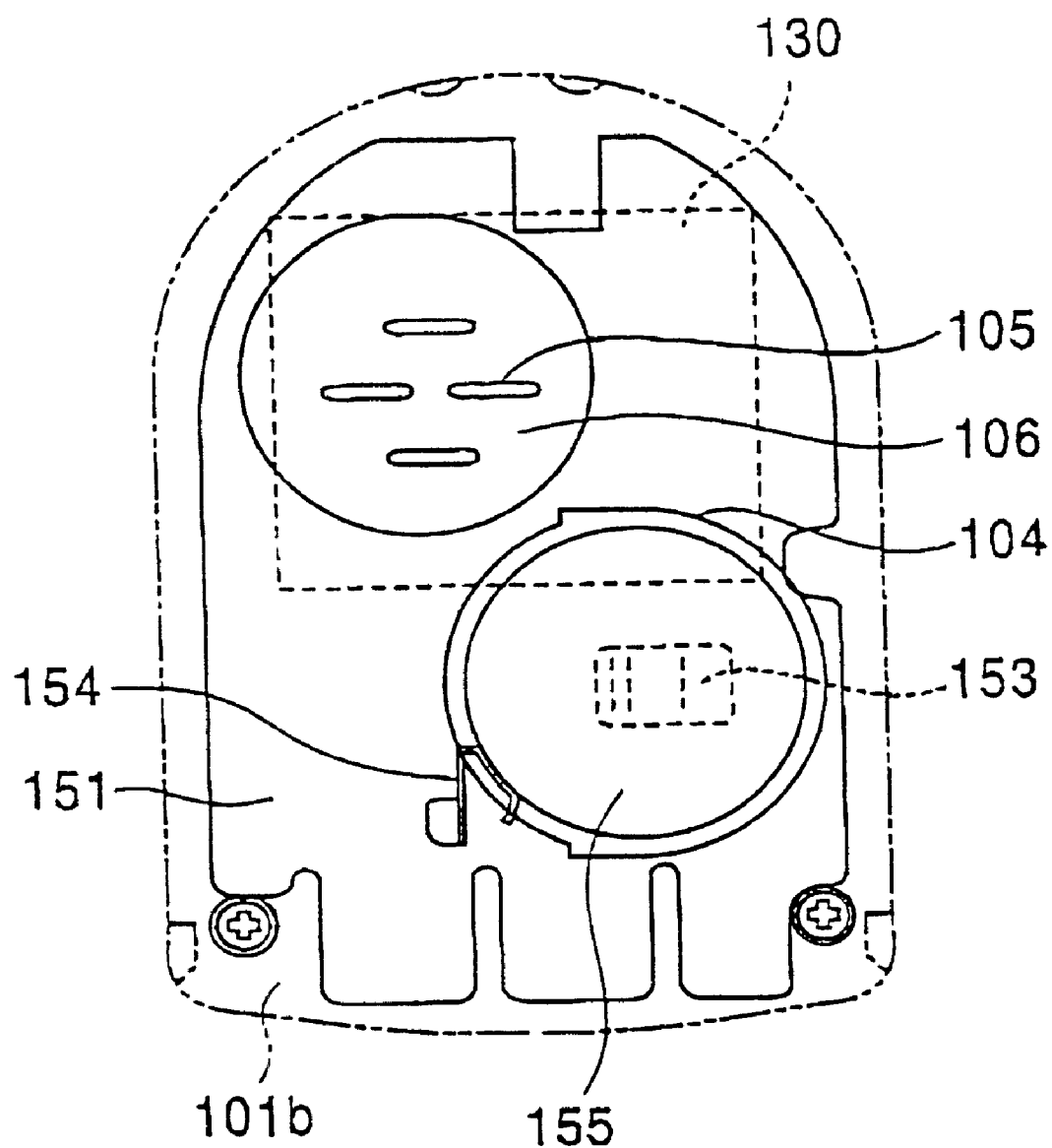
FIG. 36 is a rear view illustrating the arrangement of a board and a battery for use in the portable electronic device shown in FIG. 11.

A battery holder 104 is attached to the rear portion of the housing 101, as illustrated in FIG. 35. The battery holder 104 is used for fixing a battery, which supplies drive power to the individual elements of the electronic device 100, to the housing 101. The battery holder 104 is detachably attached to the housing 101 in such a manner that it covers an aperture formed in the rear portion of the housing 101. The battery holder 104 has, as illustrated in FIG. 36, a battery 155 for supplying power to the electronic circuit within the housing 101. The battery 155 is formed in a disc-like shape, and is referred to as a "button battery". When the battery holder 104 having the battery 155 is attached to the housing 101, the peripheral surface of the battery, which serves as a positive electrode, is brought into contact with a positive power supply terminal 154 provided on the board 151, and the main surface of the battery 155, which serves as a negative electrode, is brought into contact with a negative power supply terminal 153. In this manner, the battery 155 is connected to the electronic circuit on the board 151, thereby supplying power to the electronic circuit.

At the rear portion of the housing 101, a reset button (not shown) for resuming the settings of the electronic device 100 to the original settings when the electronic device 100 was shipped is provided at the backward of a hole formed in the housing 101. The reset button can be pressed, for example, with a pin.

Figure 37:
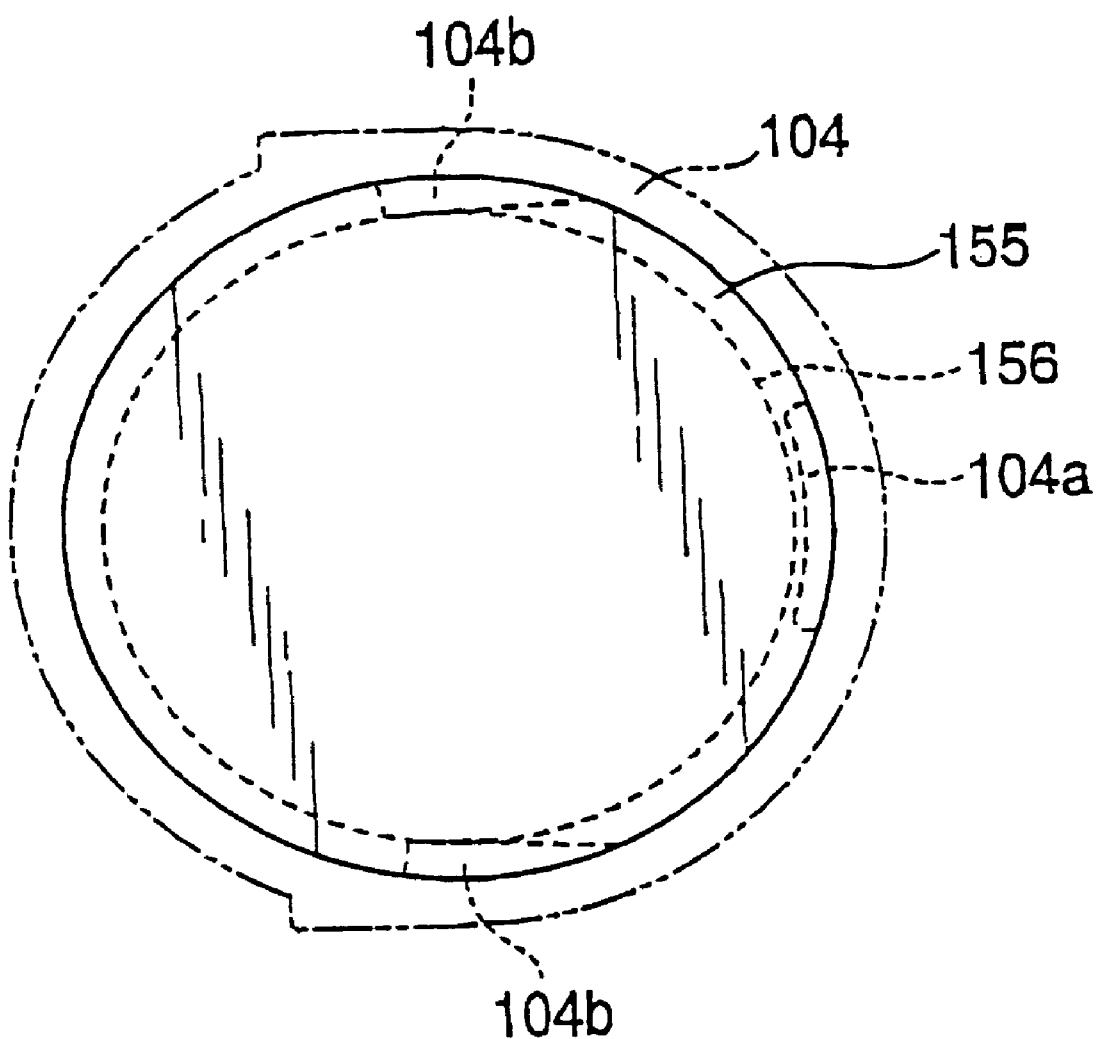
FIG. 37 is a rear view illustrating the configuration of one example of a battery holder for use in the portable electronic device shown in FIG. 11.
Figure 38:
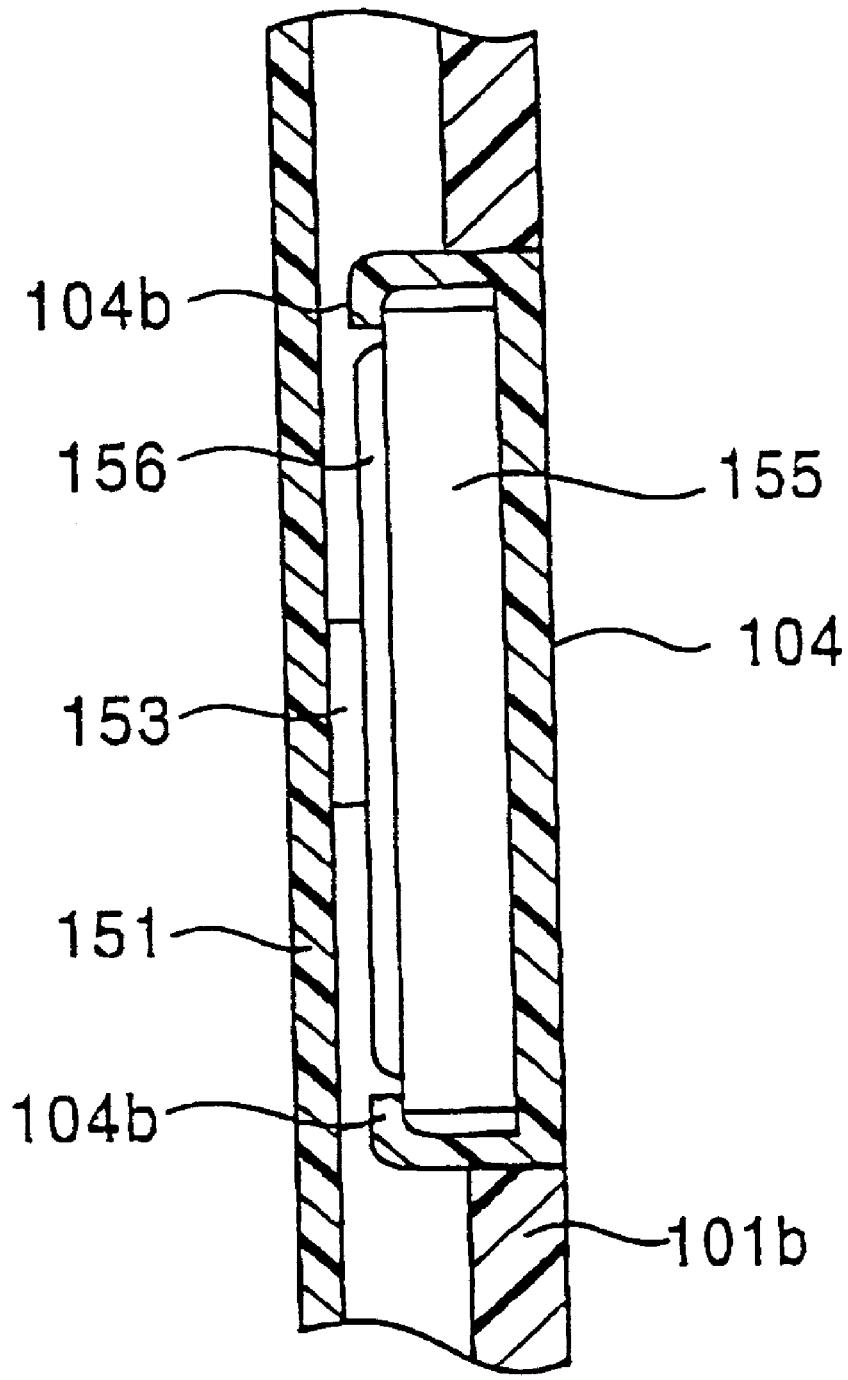
FIG. 38 is a sectional view illustrating the configuration of the battery holder for use in the portable electronic device shown in FIG. 11.

The battery holder 104 is formed, as shown in FIG. 37, generally in a disc-like shape and is slightly larger than the battery 155. The battery holder 104 has hook-like battery holder portions 104a and 104b for holding the peripheral portion of the battery 155. When holding the peripheral portion of the battery 155, as illustrated in FIG. 38, the forward ends of the battery holding portions 104a and 104b are brought along the peripheral portion of a projection 156 of the negative electrode. The battery 155 cannot advance into a gap between the battery holding portions 104a and 104b because of the projection 156 while the negative electrode of the battery 155 faces downward on the battery holder 104. Only when the positive electrode of the battery 155 faces downward on the battery holder 104, the battery 155 can advance into the gap between the battery holders 104a and 104b since the projection 156 projects from the gap between the battery holding portions 104a and 104b. That is, the battery holding portions 104a and 104b serve the function of preventing the battery 155 from being held by the battery holder 104 in the wrong polarity.

Figure 39:
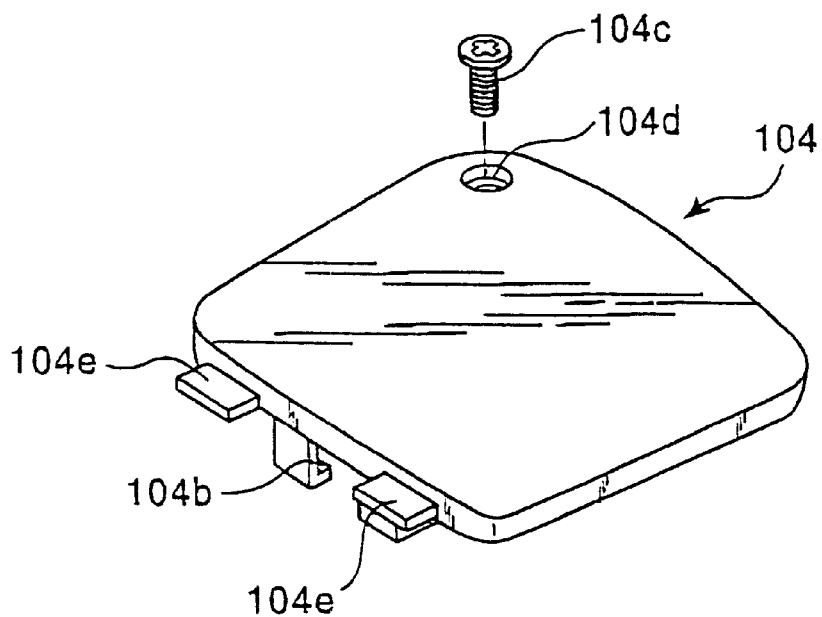
FIG. 39 is an outer perspective view illustrating another example of the battery holder for use in the portable electronic device shown in FIG. 11.
Figure 40:
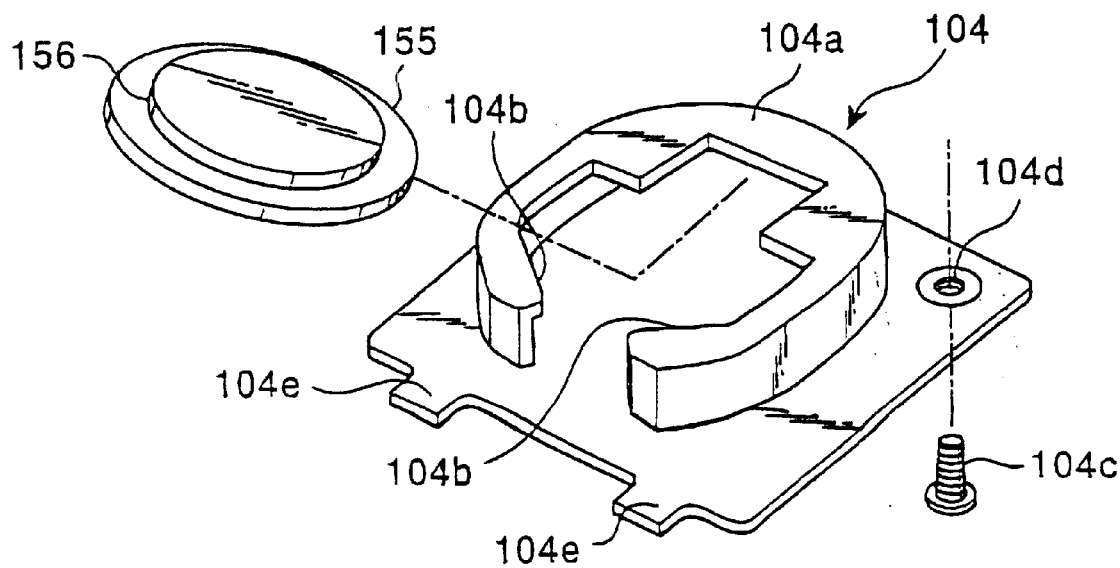
FIG. 40 is an inner perspective view illustrating the battery holder shown in FIG. 39 for use in the portable electronic device shown in FIG. 11.

The battery holder 104 may be formed, as shown in FIG. 39, in a quadrilateral shape. In this case, the battery holder 104 may be provided with a threaded hole 104d and engaging pawls to be engaged with the edge portion of an aperture provided for the housing 101. A screw 104c fits into the threaded hole 104d and further fits into the threaded hole provided for the housing 101. The battery holder 104 has on its reverse surface, as illustrated in FIG. 40, battery holding portions 104a and 104b between which the battery 155 is held in a predetermined polarity.

Figure 41:
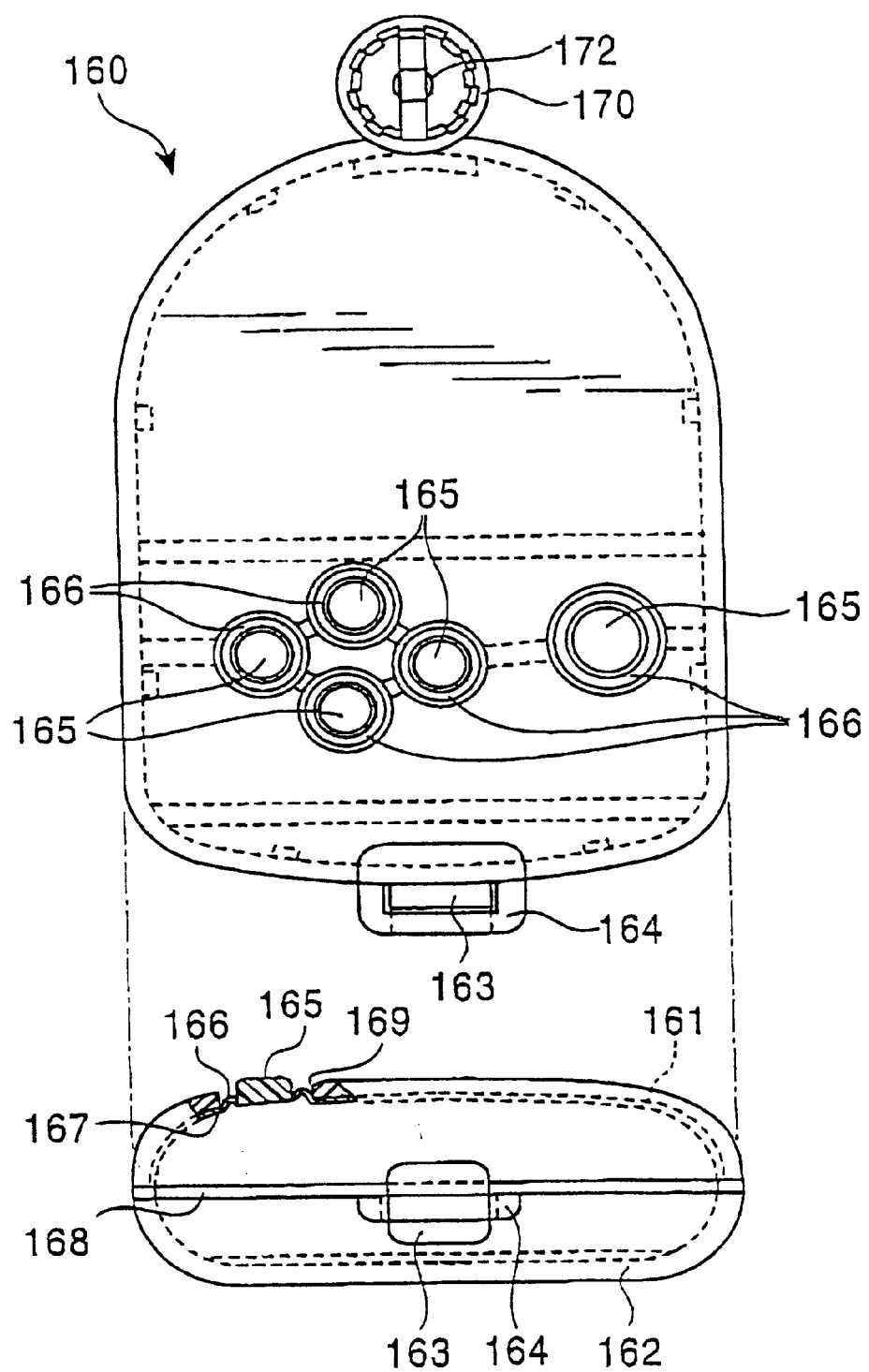
FIG. 41 is a front view and a rear view illustrating the configuration of a protective casing for storing the portable electronic device shown in FIG. 11.

As shown in FIG. 41, an electronic-device protective casing generally represented by 160 for storing the above-configured electronic device 100 is formed of an upper casing 161 and a lower casing 162. By being abutted against the upper casing 161, the lower casing 162 forms a hermetically sealed gap for storing the electronic device 100 between the upper casing 161 and the lower casing 162. The upper casing 161 and the lower casing 162 are formed of a transparent synthetic resin material, such as polymethylmethacrylate or polycarbonate.

Figure 42:
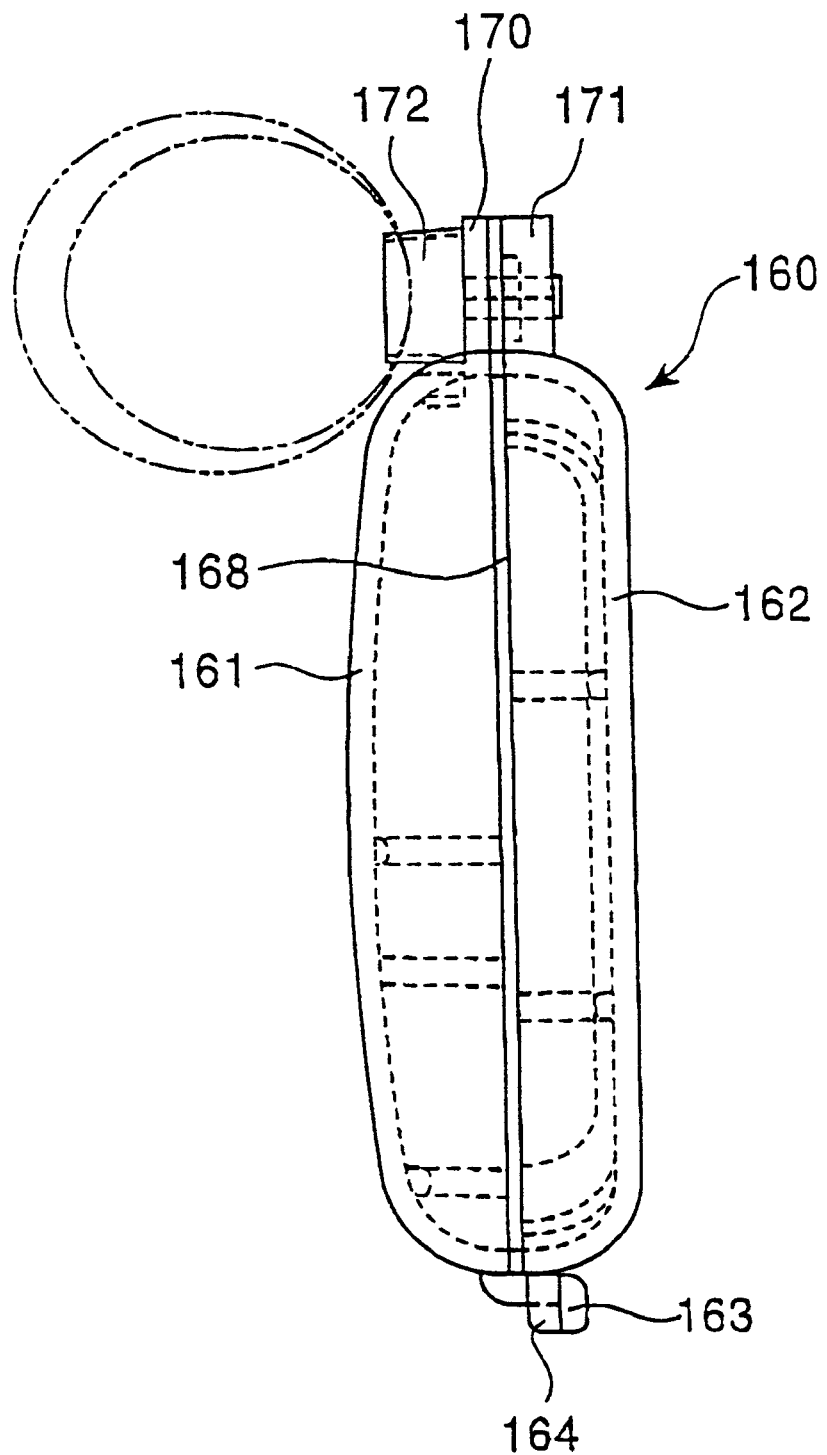
FIG. 42 is a side view illustrating the protective casing shown in FIG. 41.

Each of the upper casing 161 and the lower casing 162 has an engaging portion at one end. The engaging portions includes a hook-like engaging pawl 163 provided for the upper casing 161, and an engaging ring 164 provided for the lower casing 162. The engaging pawl 163 is fitted into the engaging ring 164 so that the upper casing 161 and the lower casing 162 can be held while abutting against each other. A fastening portion is provided at the other ends of the upper casing 161 and the lower casing 162. The fastening portions include a screw inserting strip 170 provided for the upper casing 161 and a screwing strip 171 provided for the lower casing 162. The screw inserting strip 170 and the screwing strip 171 are overlaid on each other while the upper casing 161 and the lower casing 162 abut against each other. A fastening screw 172 is then fitted into a threaded hole formed in the screw inserting strip 170 and is further fitted into a threaded hole provided for the screwing strip 171, thereby fixing the screw inserting strip 170 to the screwing strip 171. Thus, the upper casing 161 and the lower casing 162 are maintained in such a manner that they abut against each other. A linear slit for receiving the peripheral portion of, for example, a coin, is formed in the head of the fastening screw 172. That is, the fastening screw 172 is easily rotated, as shown in FIG. 42, by fitting the peripheral portion of a coin into the above-mentioned slit.

At least one of the upper casing 161 and the lower casing 162, for example, the upper casing 161, is provided with a plurality of transparent holes 169 corresponding to the operators 121 and 122 provided for the electronic device 100 to be stored in the gap formed by the upper casing 161 and the lower casing 162. The transparent holes 169 are closed, as shown in FIG. 41, by a hermetically sealing element 167, which serves as buttons 165. The hermetically sealing element 167 is formed of an elastic material (elastomer) and is attached to the reverse surface of the upper casing 161. The buttons 165 are movable by popping out or pushing down with respect to the level of the upper surface of the upper casing 161 due to an elastic deformation of the hermetically sealing element 167 placed in the vicinity of the inner peripheral portion of the transparent holes 169. The hermetically sealing element 167 is integrally formed with a sealing element 168 for sealing between the abutting portions of the upper casing 161 and the lower casing 162. The sealing element 168 is disposed along the whole circumference of the edge portion at which the upper casing 161 and the lower casing 162 abut against each other. The sealing element 168 seals the portion between the upper casing 161 and the lower casing 162 when the upper casing 161 and the lower casing 162 abut against each other. Additionally, the sealing element 168 prevents the entry of water into the protective casing 160. That is, by virtue of the sealing element 168, the protective casing 160 is used not only for protecting the electronic device 100 from vibrations and shock, but also as a waterproof casing.

Figure 43:
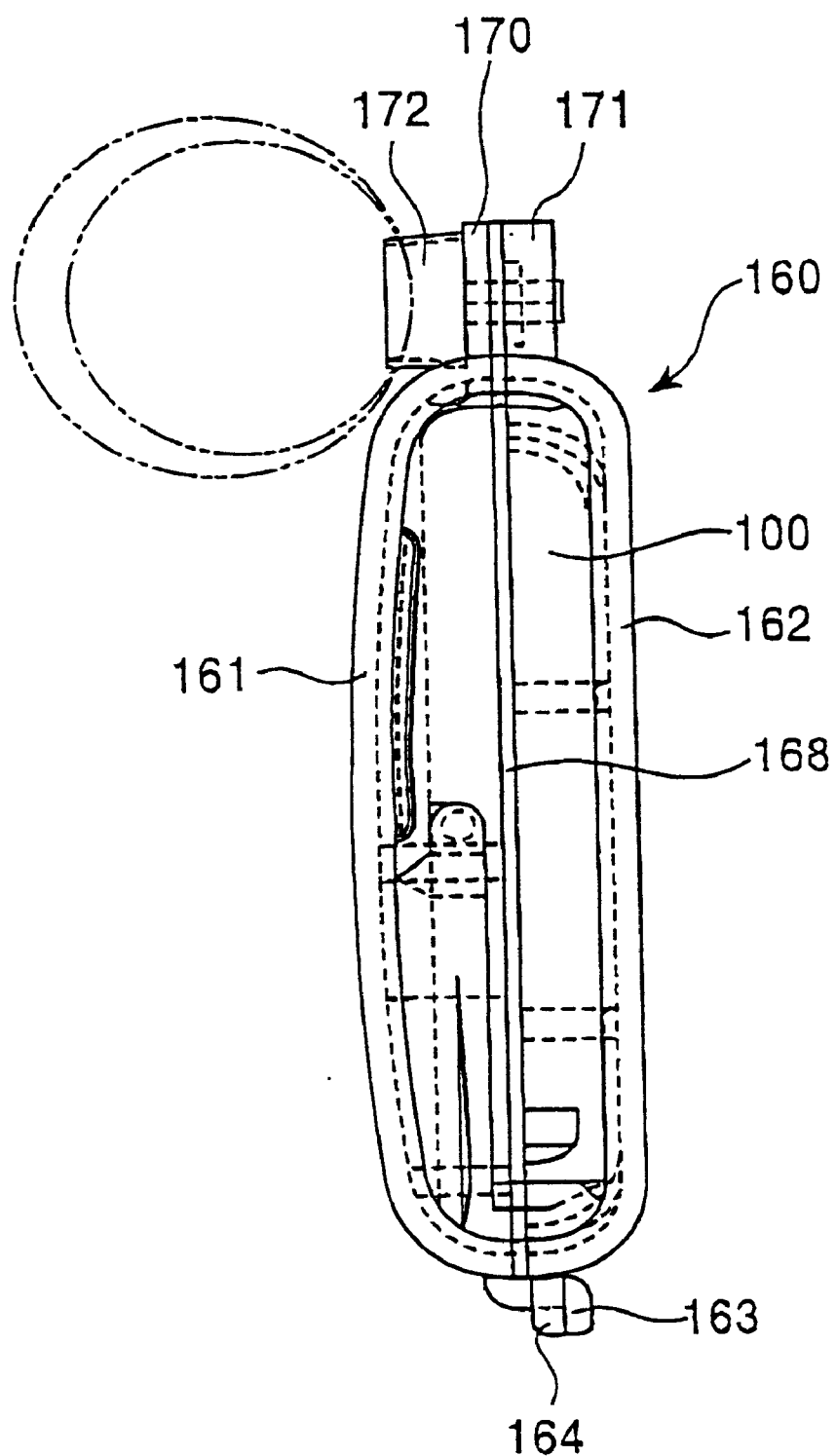
FIG. 43 is a side view illustrating the protective casing in which the portable electronic device shown in FIG. 11 is stored.
Figure 44:
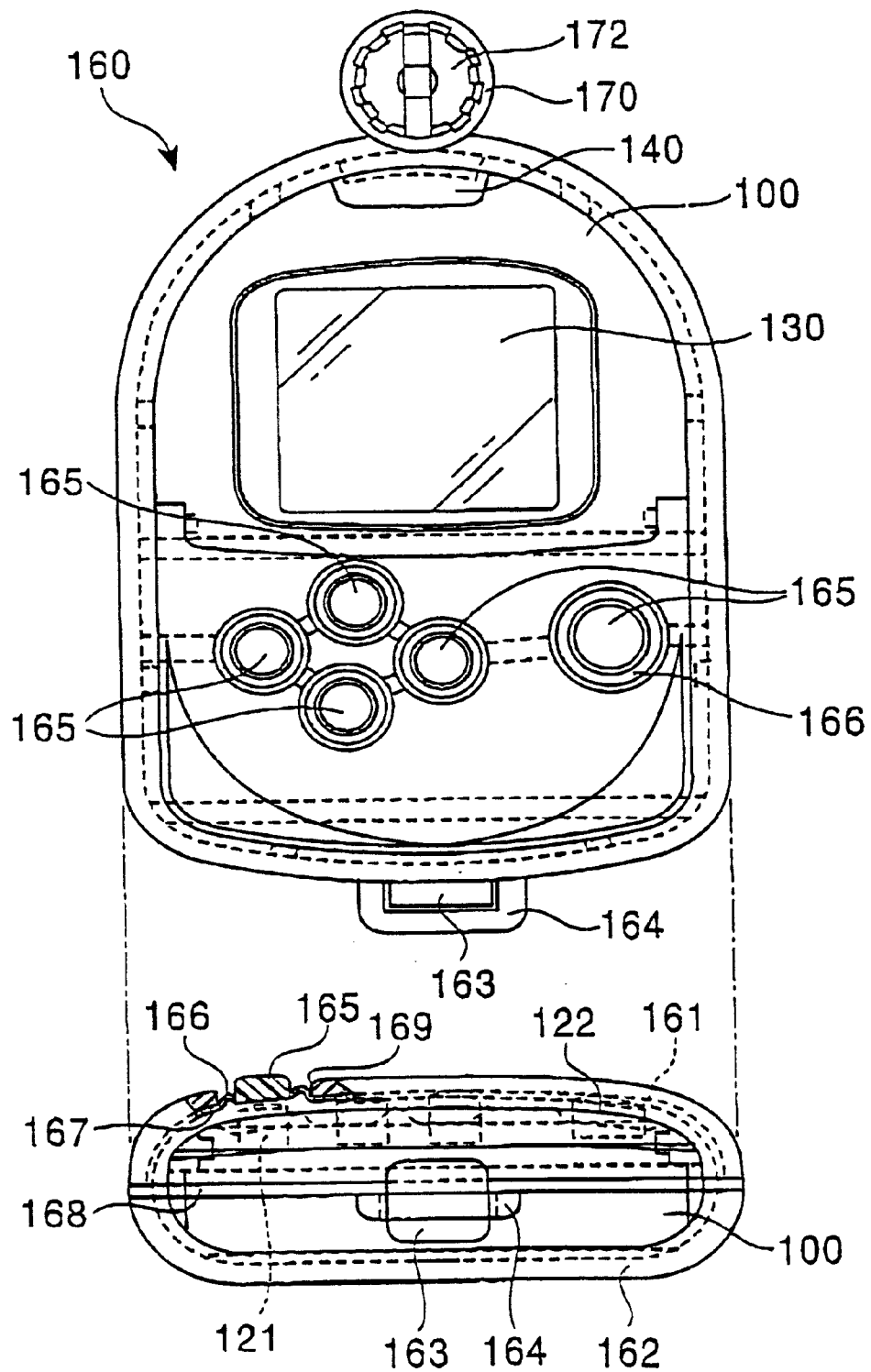
FIG. 44 is a front view and a rear view illustrating the configuration of the protective casing in which the portable electronic device shown in FIG. 11 is stored.

The portable electronic device 100 is stored, as shown in FIG. 43, in the above-described protective casing 160 with the display unit 130 facing the upper casing 161. Then, the buttons 165 are brought into contact with the pressing surfaces of the operators 121 and 122, as shown in FIG. 44. Accordingly, while the electronic device 100 is stored in the protective casing 160, by pressing the buttons 165, the pressing switch 157 can be operated via the corresponding operators 121 and 122 and the corresponding switch-pressing portions 102 and 103.

The protective casing 160 may be provided with a magnifier at the position corresponding to the display unit 130 of the electronic device 100 to be stored in the protective casing 160. That is, an outer wall of the portion of the protective casing 160 corresponding to the display unit 130 is projected to form a concave shape, which then serves as a concave lens, thereby making it possible to magnify the display unit 130.

A hinge structure constructed in accordance with the present invention is described below with reference to FIGS. 25, 26, 45 through 49.

The lid 110 is pivotally supported by the housing 101 at degrees ranging from when the lid 110 is closed, or in a lying state, to cover the terminals 152 (see FIG. 14) and to when the lid 110 is opened, or in a rising state, to allow the terminals 152 to face outward.

More specifically, the lid (movable portion) 110 is provided with at one side, as shown in FIGS. 25 and 26, a pair of arms 113, 113. The arms 113 are further provided with a pair of shafts 111, 111, respectively, projecting from the arms 113 and facing inward. The shafts 111, 111 are fitted into a pair of bearings 107, 107, respectively, provided at both sides of the central portion of the top surface of the housing 101 (main unit). With this arrangement, the lid 110 is pivotally supported by the housing 101.

Figure 45:
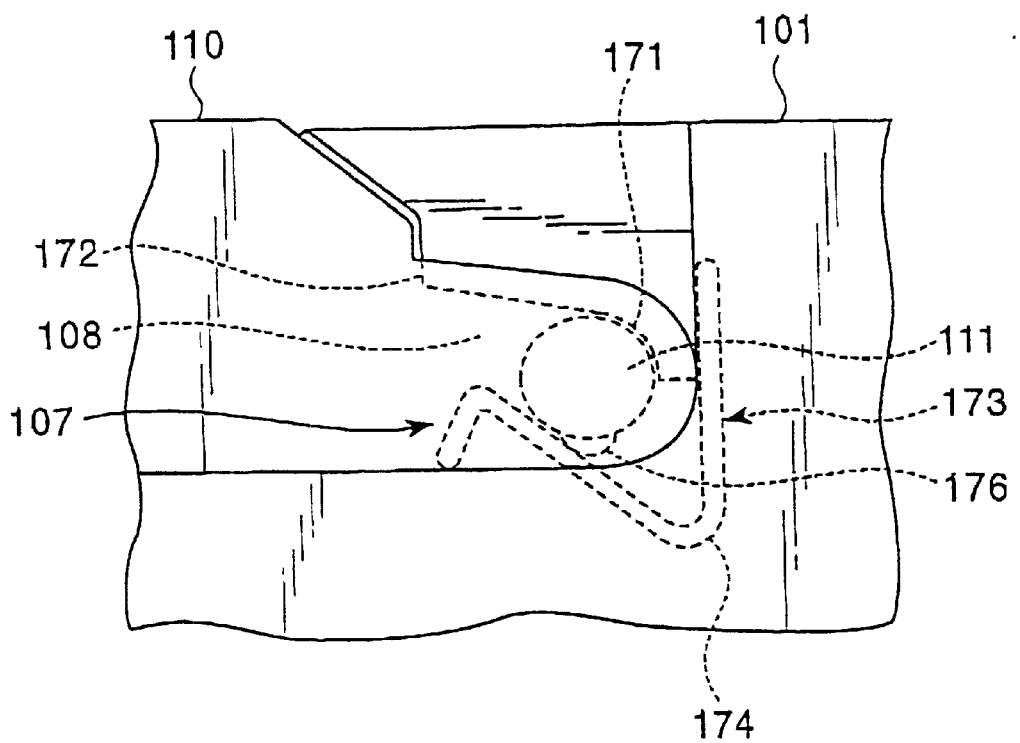
FIG. 45 is a side view illustrating the arrangement of a hinge structure according to the present invention.
Figure 46:
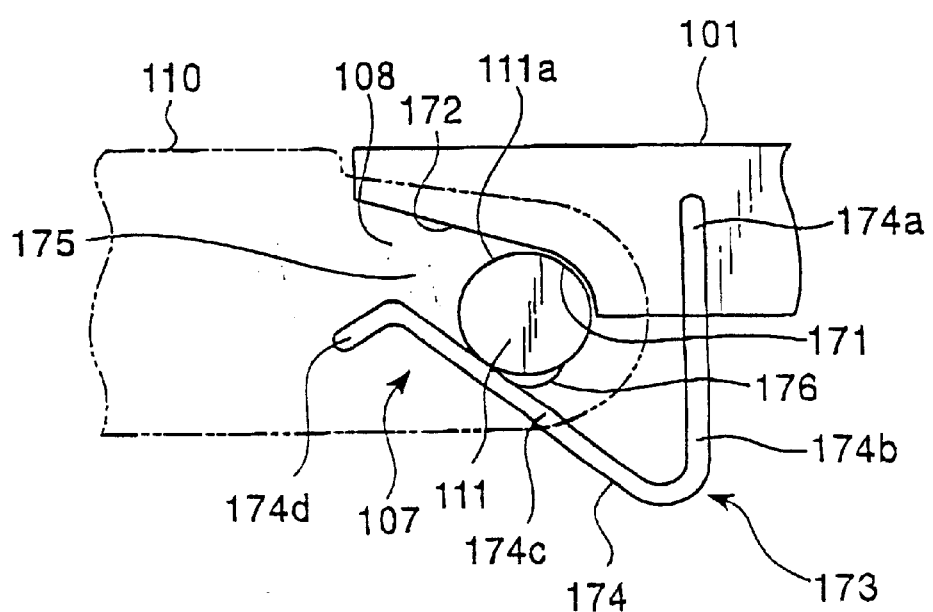
FIG. 46 is a side view illustrating the hinge structure shown in FIG. 45.

As illustrated in FIGS. 45 and 46, the bearings 107 are provided in grooves 108 formed along the lateral sides of the housing 101, and each have a first bearing 171 for receiving part of the peripheral surface of the shaft 111. The first bearing 171 is formed by or as part of the housing 101, for example, which is a non-elastic element. More specifically, a tilting surface 172 is provided at the lower surface of the housing 101, and is inclined downward as it is farther away from the terminals 152. The first bearing 171 is provided at the lower side of the tilting surface 172, and the surface for receiving the shaft 111 is preferably formed in an arch-like shape.

The housing 101 is also provided with a second bearing 173 for receiving part of the peripheral surface of the shaft 111. The first bearing 171 and the second bearing 173 receive different parts of the shaft 111. The second bearing 173 is preferably formed of an elastic material 174, such as a leaf spring. The leaf spring 174 includes, as illustrated in FIG. 46, a stationary portion 174a fixed or secured to the housing 101, a pendant portion 174b hanging from the stationary portion 174a, a tilting portion 174c inclined upward from the pendant portion 174b to the above-described tilting surface 172, and a free end 174d inclined downward from the top end of the tilting portion 174c. The tilting portion 174c is formed in a planar shape and receives the shaft 111 in cooperation with the arch-like first bearing 171.

A shaft-attaching/detaching opening 175 is formed between the tilting surface 172 of the housing 101 and the top end of the tilting portion 174c of the leaf spring 174 through which the shaft 111 can be attached to or detached from the housing 101 in the axial direction. The relative spacing of the tilting surface 172 and the first bearing 171 to the tilting portion 174c becomes narrower toward the shaft-attaching/detaching opening 175, i.e., toward the terminals 152.

The shaft 111 is provided with a cam (projection) 176. That is, the shaft 111 has a surface 111a and the cam 176 provided on part of the surface 111a.

Figure 47A:
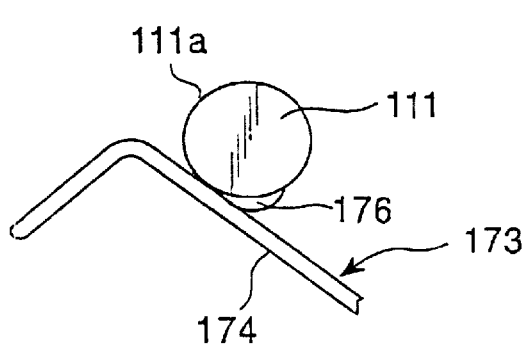
FIGS. 47A, 47B, and 47C illustrate a cam provided for the hinge structure shown in FIG. 45.
Figure 47B:
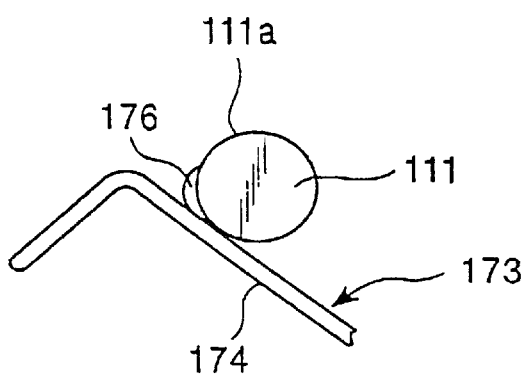

The cam 176 is located on the surface 111a of the shaft 111 at the position at which the leaf spring 174 elastically slides over the cam 176 while the lid 110 pivots from the opened (rising) state to the closed (lying) state. That is, when the lid 110 is opened, the cam 76 is positioned as shown in FIG. 47B. When the lid 110 is closed, the cam 176 is positioned as shown in FIG. 47A. While the lid 110 pivots, the leaf spring 174 is elastically displaced as illustrated in FIG. 47C, to slide over the cam 176.

Figure 46A:
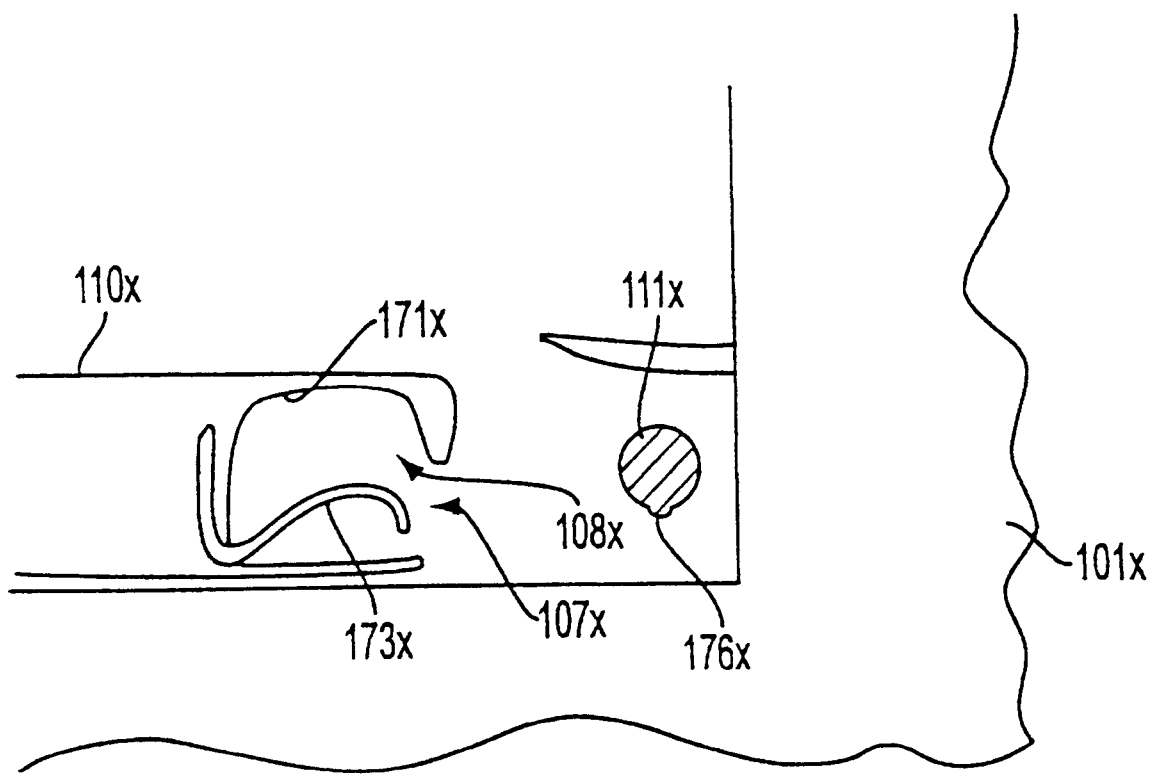
FIG. 46A is a side view of the hinge structure illustrating the shaft on the main unit and the bearing unit on the movable unit.

As illustrated in FIG. 46A, a shaft 111x having a cam member 176x may be provided on the main unit 101x, while a bearing unit 107x may be provided in a groove 108x on the movable unit 110x. The bearing unit 107x, comprised of a first bearing unit 171x and a second bearing unit 173x, functions in a similar manner as the first bearing 171 and second bearing 173 of FIGS. 45 and 46, while the shaft 111x also performs an analogous function as the shaft 111 of FIGS. 45 and 46. While FIG. 46a shows an alternative placement of the shaft 111x and bearing unit 107x with respect to the movable unit 110x and main unit 101x, it is preferable to have the shaft on the movable unit as described heretofore, and the bearing unit on the main unit as also described heretofore, particularly since it is easier to manufacture the shaft on the movable unit.

Figure 47C:
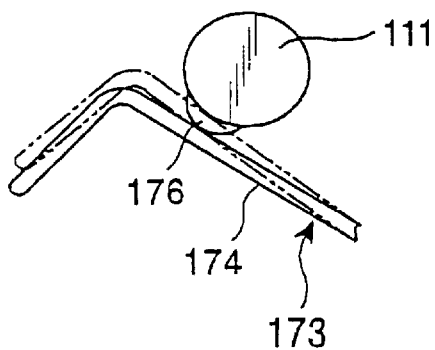

The lid or movable unit 110 can be attached to or detached from the housing or main unit 101 by inserting the shaft 111 into the bearing 107 or releasing the shaft 111 from the bearing 107 due to an elastic deformation of the leaf spring 174, as shown in FIGS. 47A through 47C. The lid 110 can be attached to or detached from the housing 101 regardless of the position of the cam 176. It is however relatively easy to attach or detach the lid 110 when the lid 110 is opened in a state in which the cam 176 faces sideways, as shown in FIG. 47B.

Figure 48:
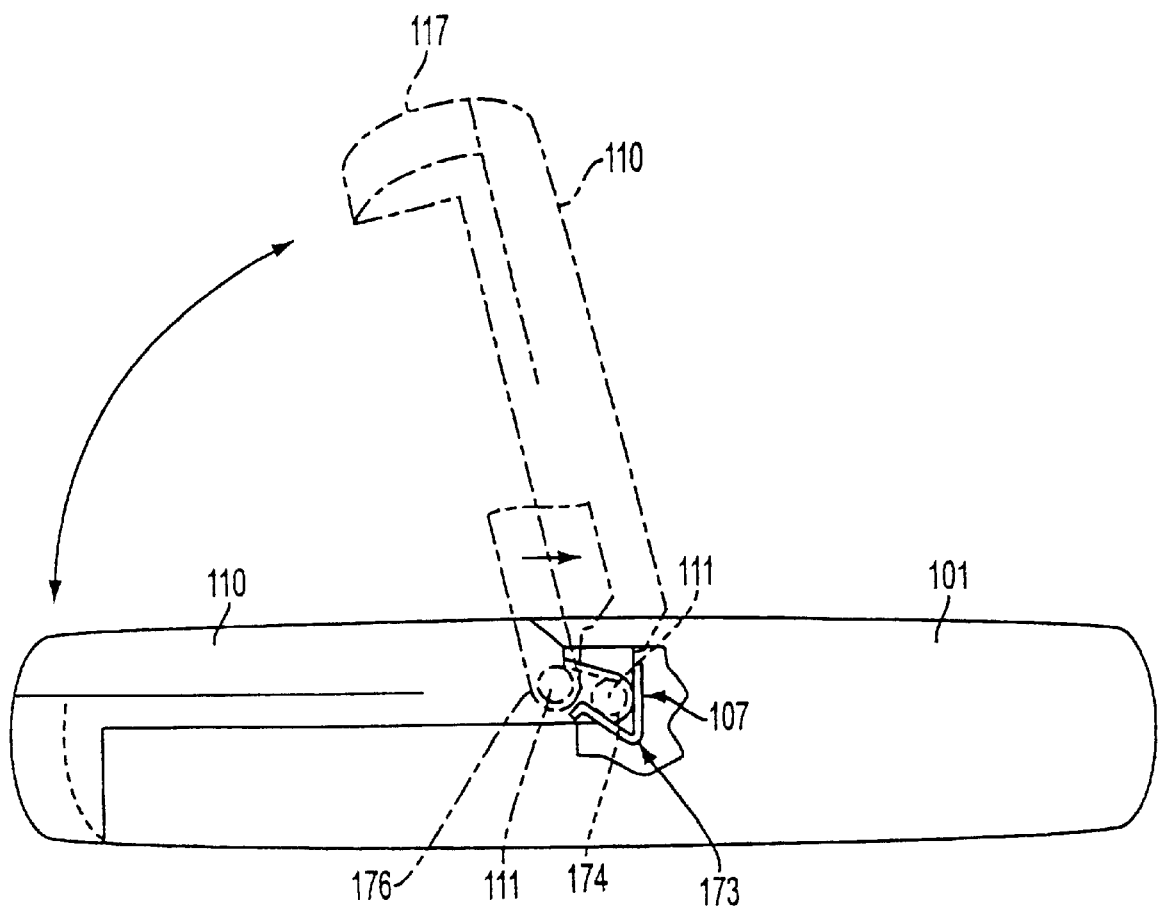
FIG. 48 illustrates a lid incorporating the hinge structure being attached to the video game machine.
Figure 49:
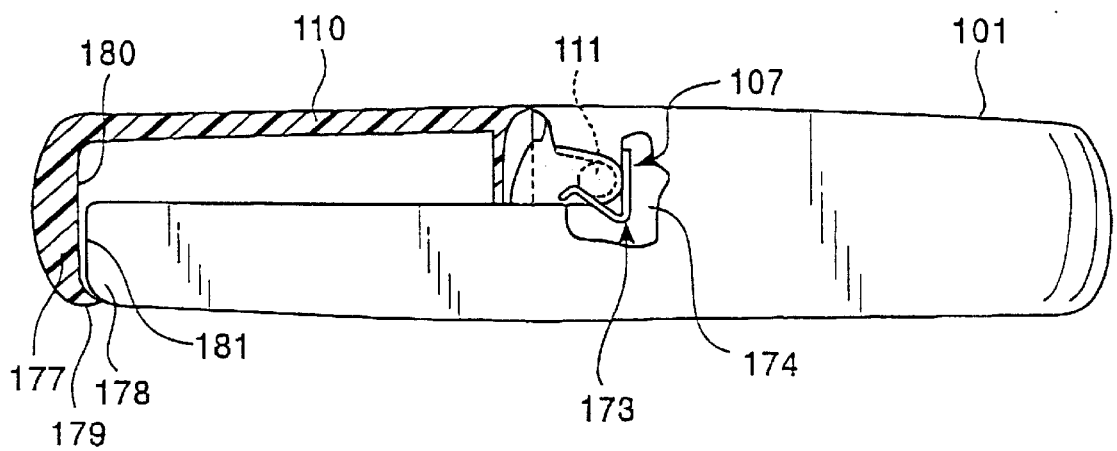
FIG. 49 illustrates the lid incorporating the hinge structure being closed.
Figure 50:
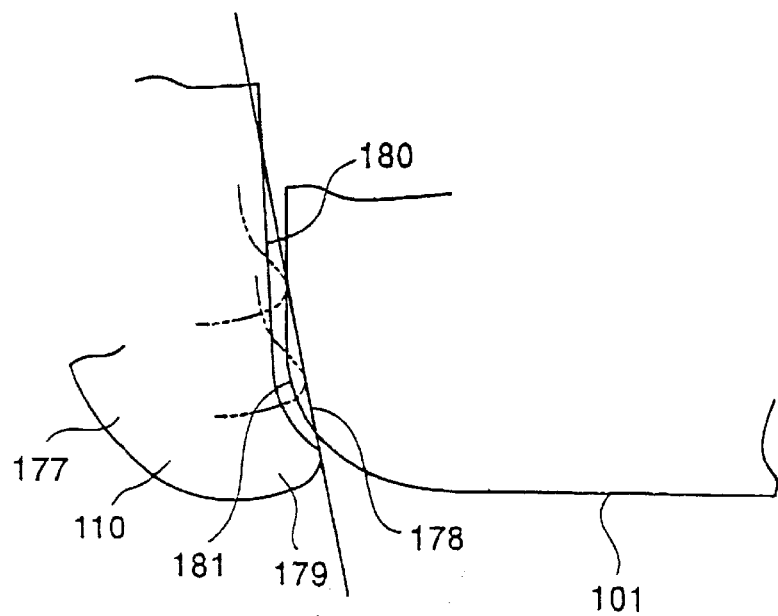
FIG. 50 illustrates the lid incorporating the hinge structure being opened and closed.

A covering portion 177 for covering the terminals 152 is provided, as shown in FIGS. 48 and 49, at the side opposite to the shaft 111 of the lid 110. An engaging projection 179 is formed at the forward end of the covering portion 177. The engaging projection 179 is engaged with an engaging portion 178 disposed at the lower front portion of the housing 101 when the lid 110 is closed. That is, the covering portion 177 forms a recessed shape 180 at the inner side facing the housing 101. Meanwhile, the front portion of the housing 101 forms a projection shape 181. When the lid 110 is to be opened or has just closed, as shown in FIG. 49, the engaging projection 179 is engaged with the engaging portion 178 at the front side of the housing 101. When the engaging projection 179 is engaged or engaging with the engaging portion 178, the lid 110 is forced to advance towards the front side of the housing 101, and simultaneously, the lid 110 is displaced in such a manner that the shaft 111 pushes itself into the space between the first bearing 171 and the second bearing 173 against an elastic force of the leaf spring 174.

With this configuration, since the shaft 111 is fixed by pressing it against the first bearing 171 with the leaf spring 174 (the second bearing 173), the shaft-attaching/detaching opening 175 widens due to an elastic deformation of the leaf spring 174 when attaching or detaching the shaft 111. That is, while attaching or detaching the shaft 111, the leaf spring 174 momentarily stretches, thereby fixing or releasing the shaft 111.

Consequently, when an excessive force is applied to the lid 110 or the housing 101, the opening 175 between the first bearing 171 and the second bearing 173 widens by the shaft 111 against an elastic force of the leaf spring 174 so as to release the shaft 111 from the bearing 107, thereby easily detaching the lid 110 from the housing 101.

Even when the lid 110 is opened with an excessive force or is stepped on in the direction in which the lid 110 is opened, the lid 110 is released from the housing 101, thereby preventing both the lid 110 and the housing 101 from being destroyed.

The cam 176 is formed on the peripheral surface of the shaft 111. Thus, when the lid or movable unit 110 is opened, a pushing-up force is exerted, causing the elastic displacement of the leaf spring 174 downward. Conversely, when the lid 110 is closed, a pulling-down force is exerted. That is, a flipping feeling can be provided.

The recessed shape 180 of the covering portion 177 of the lid 110 slides over the projection shape 181 of the housing 101, i.e., the engaging projection 179 slides over the engaging portion 178 while the leaf spring 174 momentarily stretches. Thus when the lid 110 is fully closed, a clicking feeling is provided, and a pressing force is exerted on the lid 110 against the housing 101.

The bearing surface 176 may be formed at the side opposite to the leaf spring 174, namely, since the leaf spring 174 serves as a bearing, the shaft 111 is not required to be completely held. Accordingly, the structure of the bearing can be simplified, and space saving can be achieved. The structure of a mold for manufacturing the bearing can also be simplified.

The present invention is not restricted to the foregoing embodiment, and may be used for an operator cover, which is normally used for covering the operators of an apparatus. Alternatively, the present invention may be used for a protective lid for protecting a display unit, such as a liquid crystal display or a display window. Similarly, the hinge structure of the present invention may be used on other electronic or non-electronic devices, so long as the hinge structure is situated between a movable unit and a main unit.

As is seen from the foregoing description, according to the present invention, a simple and compact hinge structure is provided, thereby achieving space saving. Additionally, a movable portion can be easily attached to and detached from the main unit of a device. Accordingly, even if an excessive force is applied to the movable portion or the main unit, they can be prevented from being destroyed.

What is claimed is:

1. A hinge structure including a movable unit and a main unit, said hinge structure for pivotally and detachably fixing the movable unit to the main unit, said movable unit being movable between an open position and a closed position with respect to said main unit, said hinge structure comprising:

a shaft having a peripheral surface and provided on one of either said movable unit or said main unit, said peripheral surface having a first portion and a second portion, and a bearing unit fixed to the one of said movable unit and said main unit that is not provided with said shaft, said bearing unit including an opening for slidably receiving said shaft into said opening, wherein said bearing unit comprises a first bearing for receiving the first portion of said peripheral surface of said shaft and a second bearing for receiving the second portion of said peripheral surface of said shaft, said first and second bearings being fixed to said bearing unit, and wherein said shaft comprises a cam projection provided on said peripheral surface for biasing said bearing unit during movement of said movable unit between the open and closed positions.

2. A hinge structure in accordance with claim 1, wherein said cam projection is located on said second portion of said peripheral surface of said shaft.

3. A hinge structure in accordance with claim 1, wherein said cam projection is located on said peripheral surface of said shaft at a position at which said cam projection slides over said second bearing while said movable unit is pivoting between an open position and a closed position.

4. A hinge structure in accordance with claims 1,
wherein a space defined between said first bearing and said second bearing becomes narrower as it is closer to said opening, at least one of said first bearing and said second bearing is elastic, and
wherein said cam projection is configured to displace said first or second bearing in a direction in which said space between said first bearing and said second bearing widens while said cam projection is being engaged with the main unit.

5. A hinge structure in accordance with claim 4, wherein said opening widens due to an elastic deformation of said first or second bearing.

6. A portable electronic device having a main unit and a movable unit and a hinge structure for pivotally and detachably fixing said movable unit to said main unit, said hinge structure comprising:

a shaft provided on said movable unit, said shaft having a peripheral surface with a cam projection provided thereon, said peripheral surface having a first portion and a second portion, and a bearing unit integrally formed on said main unit, said bearing unit including an opening for slidably receiving said shaft into said opening, and wherein said bearing unit comprises a first bearing for receiving said first portion of said peripheral surface of said shaft and a second bearing for receiving said second portion of said peripheral surface of said shaft, said first and second bearings being fixed to said bearing unit, and wherein said second bearing is elastic and said cam projection biases said second bearing during movement of said movable unit between an open position and a closed position.

7. A portable electronic device in accordance with claim 6, wherein said first bearing is formed as part of said main unit and slidably receives said shaft, and said second bearing is integrally attached to said main unit.

8. A portable electronic device in accordance with claims 7, wherein said second bearing comprises a stationary portion secured to said main unit and a receiving portion connected to said stationary portion, said receiving portion being biasable in response to the attachment or detachment of the movable unit with the main unit.

* * * * *